United States Patent
You et al.

(10) Patent No.: US 10,469,222 B2
(45) Date of Patent: Nov. 5, 2019

(54) METHOD AND MTC DEVICE FOR TRANSMITTING DMRS FOR UPLINK DATA DEMODULATION

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 196 days.

(21) Appl. No.: 15/317,332

(22) PCT Filed: Dec. 3, 2015

(86) PCT No.: PCT/KR2015/013166
§ 371 (c)(1),
(2) Date: Dec. 8, 2016

(87) PCT Pub. No.: WO2016/099057
PCT Pub. Date: Jun. 23, 2016

(65) Prior Publication Data
US 2017/0134129 A1  May 11, 2017

Related U.S. Application Data

(60) Provisional application No. 62/092,808, filed on Dec. 16, 2014.

(51) Int. Cl.
*H04L 5/00* (2006.01)
*H04W 4/70* (2018.01)
*H04L 27/26* (2006.01)

(52) U.S. Cl.
CPC .......... *H04L 5/0048* (2013.01); *H04L 5/0051* (2013.01); *H04L 5/0094* (2013.01);
(Continued)

(58) Field of Classification Search
CPC ............................ H04L 5/0048; H04W 72/02
See application file for complete search history.

(56) References Cited

U.S. PATENT DOCUMENTS

2009/0310475 A1* 12/2009 Seo .................... H04L 1/0071
370/203
2012/0093120 A1   4/2012 Ko et al.
(Continued)

FOREIGN PATENT DOCUMENTS

WO   WO 2013/020268 A1   2/2013
WO   WO-2016114544 A1 *  7/2016 ......... H04L 27/2613

OTHER PUBLICATIONS

3GPP TS 36.211, V10.4.0, (Dec. 2011), Technical Specification, "3rd Generation Parnership Project; Technical Specification Group Radio Access Network; Evolved Universal Terrestrial Radio Access (E-UTRA); Physical Channels and Modulation (Release 10)".
(Continued)

Primary Examiner — Brian D Nguyen
Assistant Examiner — Deepa Belur
(74) Attorney, Agent, or Firm — Birch, Stewart, Kolasch & Birch, LLP

(57) ABSTRACT

The present specification discloses a method for transmitting a demodulation reference signal (DMRS) for uplink data demodulation by a machine type communication (MTC) device which is configured to operate in only a part of the system band of a cell. The method may comprise the steps of: mapping a DMRS sequence to 12 sub-carriers of a physical resource block (PRB); and dividing the PRB, to which the DMRS is mapped, into N sub-PRBs. Here, each of the sub-PRBs may comprise 12/N sub-carriers to which the DMRS is mapped. The method may further comprise a step for transmitting the N sub-PRBs to a base station in N sub-frames.

6 Claims, 29 Drawing Sheets

(52) U.S. Cl.
CPC .............. *H04W 4/70* (2018.02); *H04L 5/0044* (2013.01); *H04L 27/2649* (2013.01)

(56) References Cited

U.S. PATENT DOCUMENTS

| | | | |
|---|---|---|---|
| 2013/0135984 A1* | 5/2013 | Choi .................... | H04W 72/04 370/209 |
| 2013/0155974 A1* | 6/2013 | Papasakellariou .. | H04W 72/042 370/329 |
| 2013/0176995 A1* | 7/2013 | Park ..................... | H04W 72/06 370/336 |
| 2013/0195051 A1* | 8/2013 | Koivisto ............... | H04W 72/04 370/329 |
| 2014/0269593 A1* | 9/2014 | Wang ................... | H04W 72/12 370/329 |
| 2014/0286255 A1 | 9/2014 | Nam et al. | |
| 2016/0044649 A1* | 2/2016 | Frenne ................. | H04L 5/0053 370/329 |
| 2016/0072614 A1* | 3/2016 | Blankenship .......... | H04W 4/70 370/329 |
| 2017/0181135 A1* | 6/2017 | Chen .................... | H04L 5/0048 |
| 2017/0230135 A1* | 8/2017 | Oh ........................ | H04L 1/001 |
| 2017/0317808 A1* | 11/2017 | You ...................... | H04L 5/0055 |

OTHER PUBLICATIONS

3GPP TS 36.212, V10.4.0, (Dec. 2011), Technical Specification. "3rd Generation Parnership Project; Technical Specification Group Radio Access Network; Evolved Universal Terrestrial Radio Access (E-UTRA); Multiplexing and channel coding (Release 10)".

ETRI, "Considerations on Uplink Reference Signal for MTC", R1-144916, 3GPP TSG RAN WG1 Meeting #79, San Francisco, USA, Nov. 17-21, 2014, item # 6.3.1.2.1.

NEC, "Uplink Reference Signal Enhancement for Low Cost MTC", R1-143935, 3GPP TSG RAN WG1 Meeting #78bis, Ljubljana, Slovenia, Oct. 6-10, 2014, item # 7.3.1.2.1.

* cited by examiner

DM-RS

DM-RS

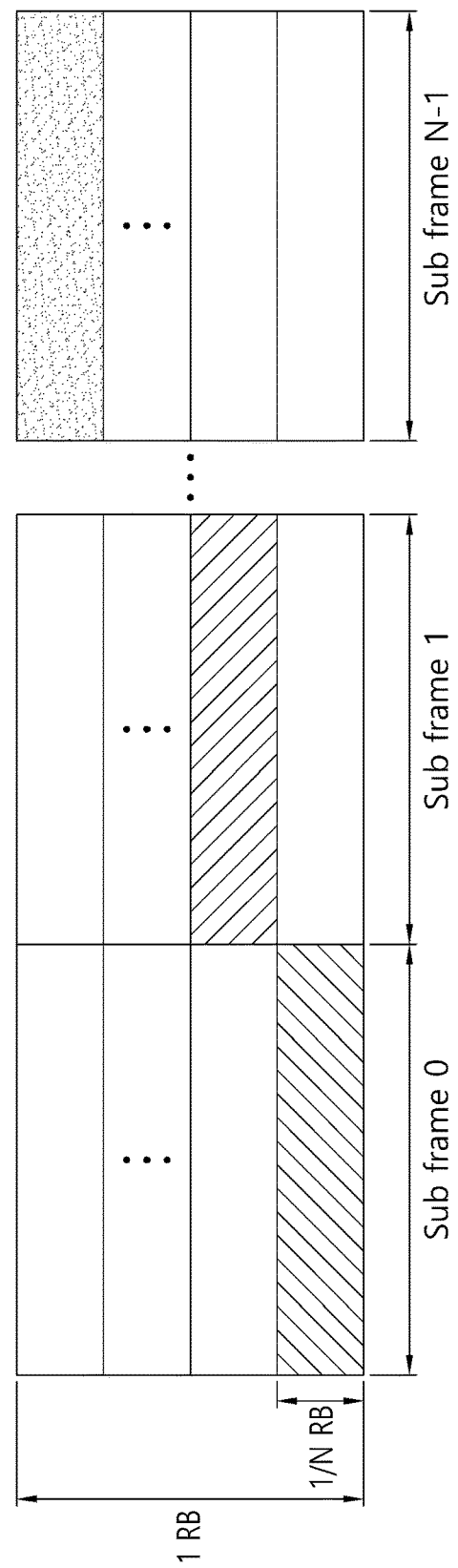

METHOD AND MTC DEVICE FOR TRANSMITTING DMRS FOR UPLINK DATA DEMODULATION

CROSS REFERENCE TO RELATED APPLICATIONS

This application is the National Phase of PCT International Application No. PCT/KR2015/013166, filed on Dec. 3, 2015, which claims priority under 35 U.S.C. 119(e) to U.S. Provisional Application No. 62/092,808, filed on Dec. 16, 2014, all of which are hereby expressly incorporated by reference into the present application.

BACKGROUND OF THE INVENTION

Field of the Invention
The present invention relates to mobile communication.
Related Art
3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in recent years, research into communication between devices or the device and a server without human interaction, that is, without human intervention, that is, machine-type communication (MTC) has been actively conducted. The MTC represents a concept in which not a terminal used by human but a machine performs communication by using the existing wireless communication network.

Since MTC has features different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

As one method for reducing manufacturing cost of the MTC device, the MTC device may use only a reduced band, that is, a subband regardless of a system bandwidth of a cell.

Furthermore, when the amount of traffic transmitted by the MTC device is small, the MTC device may preferably transmit uplink data, for example, by using only a frequency domain resource (for example, several subcarriers) having a size of one physical resource block (PRB) or less.

However, as the related art, there is a method in which the MTC device may transmit the PUSCH by using only one PRB or one or less of PRB.

Moreover, there is no method that may transmit even the demodulation reference signal (DMRS) transmitted so as for the base station to correctly demodulate the PUSCH transmitted by the MTC device in the related art by using only one PRB or one or less of PRB.

SUMMARY OF THE INVENTION

Accordingly, an object of the present invention is to solve the above-mentioned problems.

In one aspect, provided is a method for transmitting a demodulation reference signal (DMRS) for demodulating uplink data by a machine type communication (MTC) which is configured to operate in only a part of a system band of a cell. The method may include: mapping a DMRS sequence to 12 subcarriers of a physical resource block (PRB); and dividing the PRB, to which the DMRS is mapped, into N sub-PRBs. Herein, each sub-PRB may include 12/N subcarriers to which the DMRS is mapped. The method may also include transmitting the N sub-PRBs to a base station on N subframes.

The method may further include: mapping the uplink data to 12 subcarriers of the PRB to which the DMRS is mapped; and dividing the PRB, to which the DMRS is mapped, into N sub-PRBs. Herein, each sub-PRB may include 12/N subcarriers to which the DMRS is mapped. The method may further include transmitting the N sub-PRBs to which the uplink data is mapped on N subframes.

All of the N sub-PRBs to which the uplink data is mapped may be transmitted at the same frequency location on N subframes.

All of the N sub-PRBs to which the uplink data is mapped may be transmitted at different frequency locations on N subframes.

The N respective sub-PRBs to which the uplink data is mapped may be transmitted on N subframes at frequency locations which are the same as the frequency locations in the PRB before being divided.

The method may further include receiving a configuration of the value of N from the base station through a radio resource signal (RRC) or downlink control information (DCI).

In another aspect, provided is machine type communication (MTC) device which is configured to operate in only a part of a system band of a cell and transmits a demodulation reference signal (DMRS) for demodulating uplink data. The MTC device may include: an RF unit; and a processor controlling the RF unit. The processor may perform a process of mapping a DMRS sequence to 12 subcarriers of a physical resource block (PRB), a process of dividing the PRB, to which the DMRS is mapped, into N sub-PRBs. Herein, each sub-PRB may include 12/N subcarriers to which the DMRS is mapped. The process may perform a process of transmitting the N sub-PRBs to a base station on N subframes.

According to a disclosure of the present specification, the problem in the related art is solved.

BRIEF DESCRIPTION OF THE DRAWINGS

FIGS. 14a to 14c illustrate an example of resource mapping according to PUSCH transmission method 2 presented by the present specification.

DESCRIPTION OF EXEMPLARY EMBODIMENTS

Figure 1:
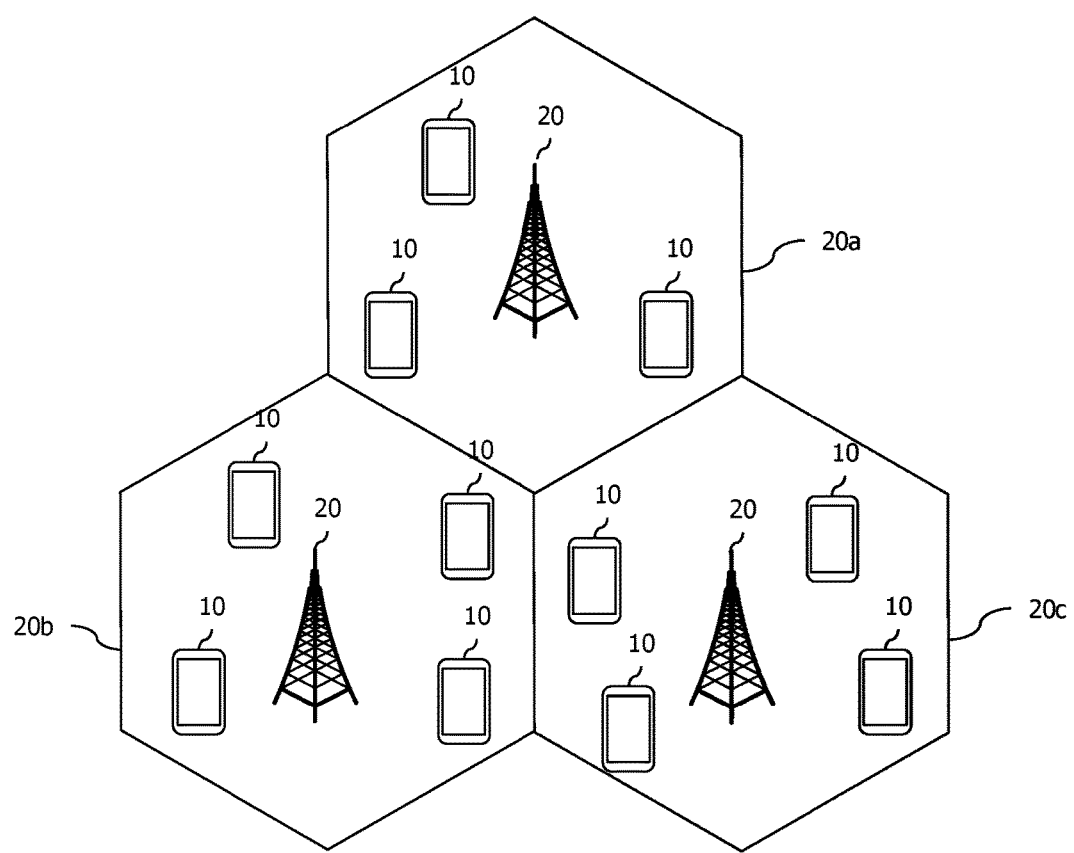
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UEI 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and, the downlink transmission are divided by the unit of a subframe, the uplink transmission and the downlink transmission are performed in different subframes.

Hereinafter, the LTE system will be described in detail.

Figure 2:
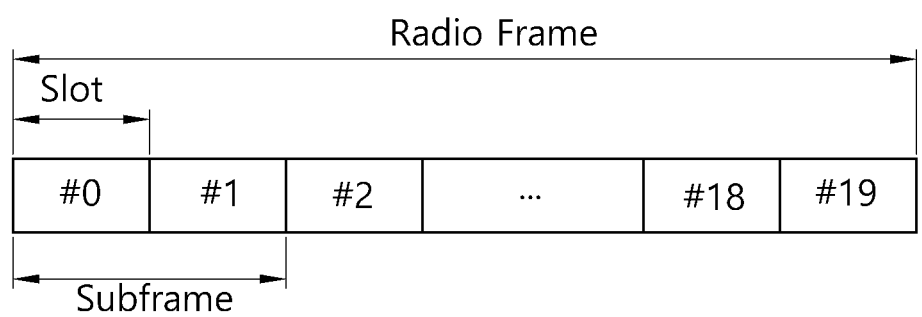
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
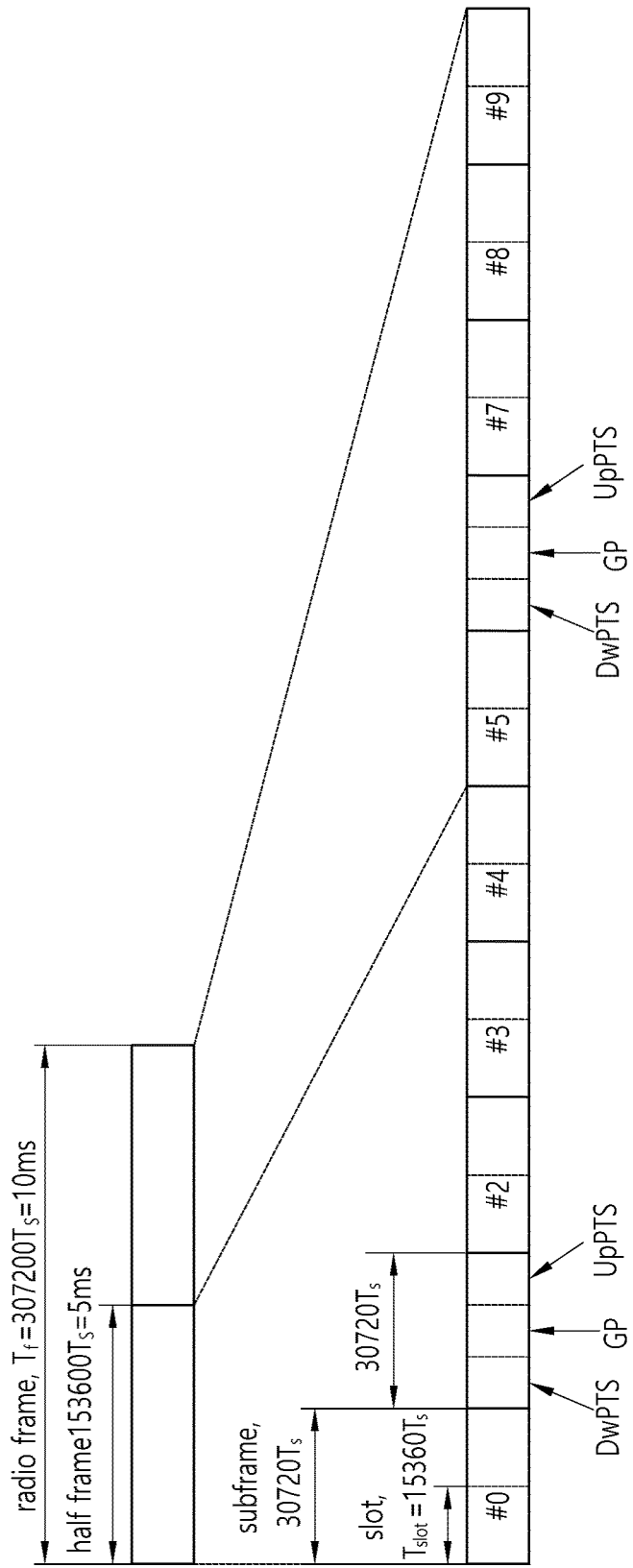
FIG. 3 illustrates a structure of a downlink radio frame according to TDD in the 3GPP LTE.

FIG. 3 Illustrates the Architecture of a Downlink Radio Frame According to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame.

When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

Figure 4:
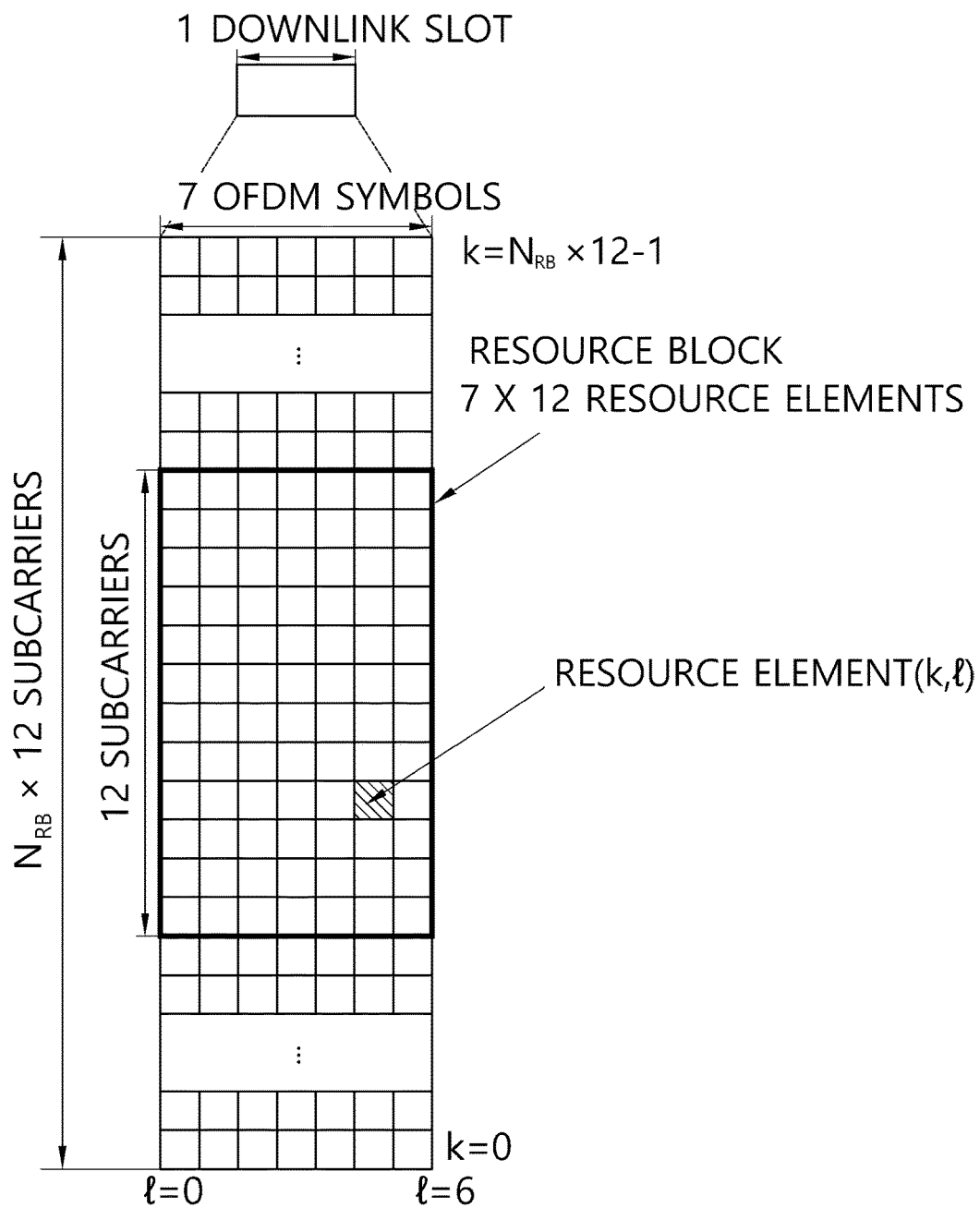
FIG. 4 is an exemplary diagram illustrating a resource grid for one uplink or downlink slot in the 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
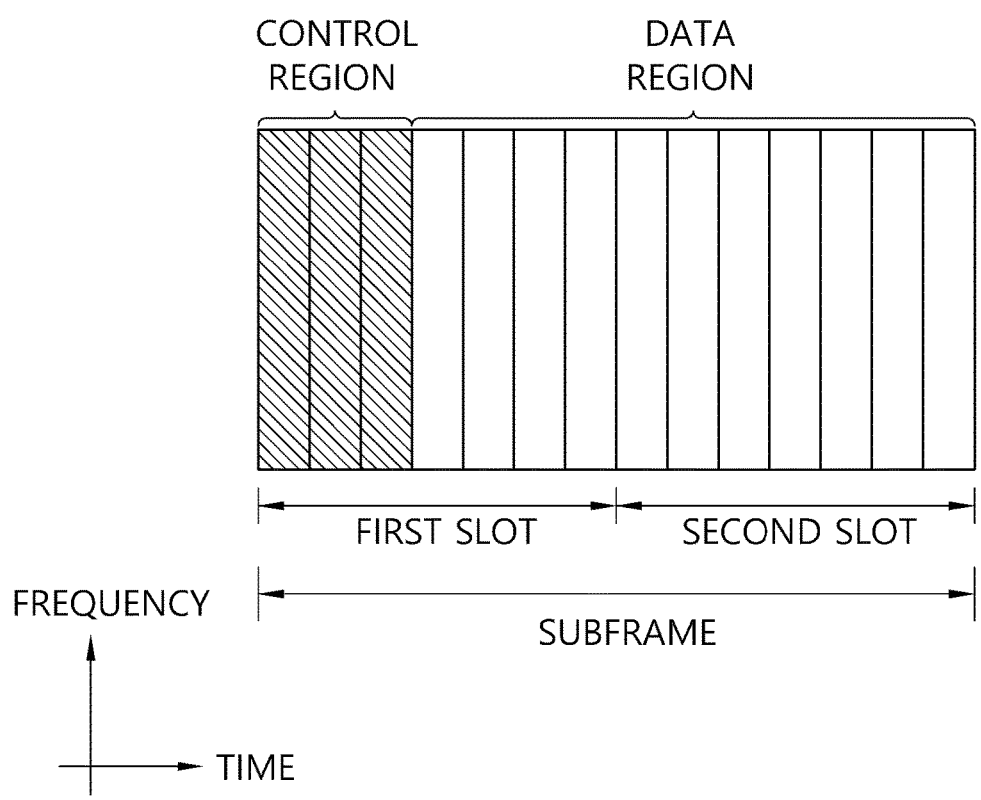
FIG. 5 illustrates a structure of a downlink subframe.

FIG. 5 Illustrates the Architecture of a Downlink Sub-Frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical, hybrid-ARQ indicator channel) and PUCCH (physical uplink control channel).

Figure 6:
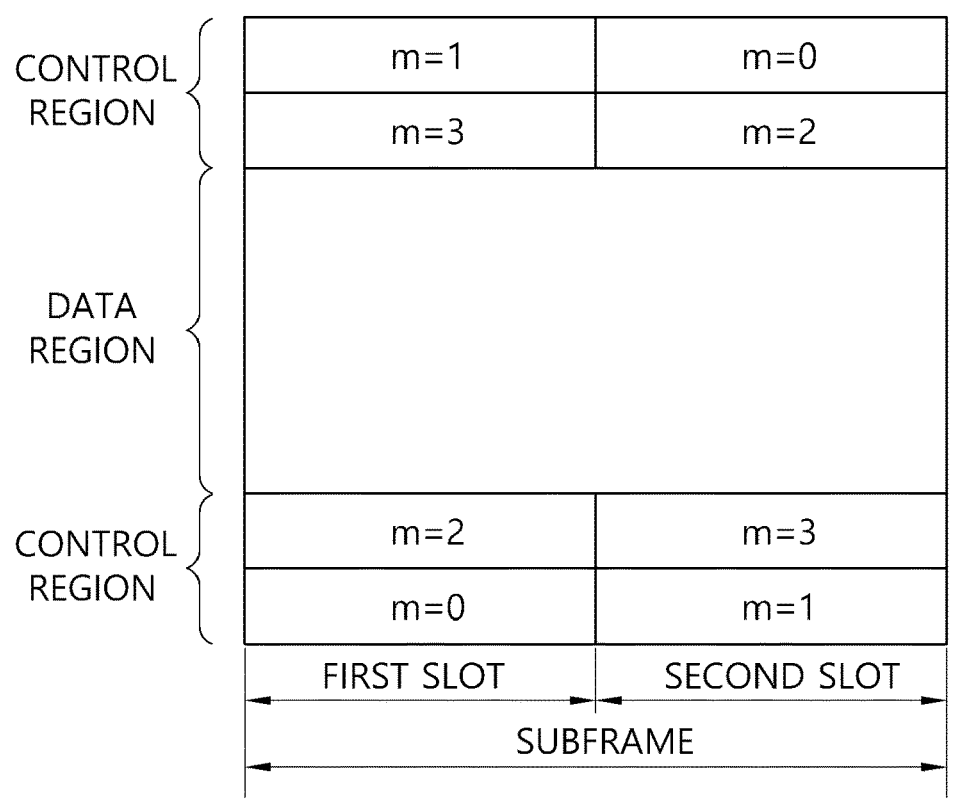
FIG. 6. illustrates a structure of an uplink subframe in 3GPP LTE.

FIG. 6. Illustrates a Structure of an Uplink Subframe in 3GPP LTE.

Referring to FIG. 6, an uplink subframe may be divided into a control region and a data region in a frequency domain. The control region is allocated a PUCCH for transmission of uplink control information. The data region, is allocated a PUSCH for transmission of data (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel. Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

The UL transport block may be transported on the PUSCH together with the UCI. This is referred to as multiplexing.

Figure 7:
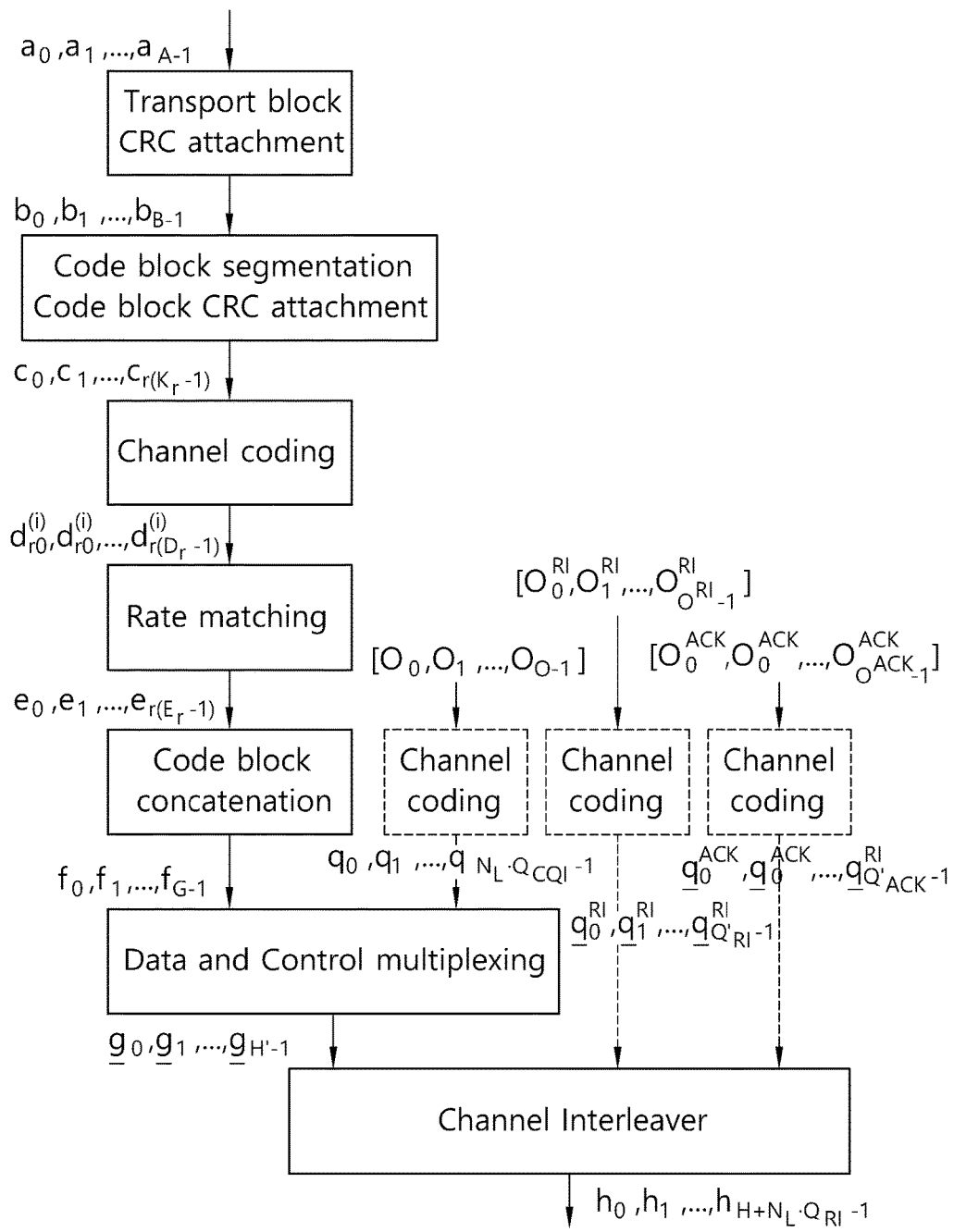
FIG. 7 is an exemplary diagram illustrating an example in which a transport block and a UCI for a UL-SCH are multiplexed in 3GPP LTE.

FIG. 7 is an Exemplary Diagram Illustrating an Example in which a Transport Block and a UCI for a UL-SCH are Multiplexed in 3GPP LTE.

This may refer to Section 5 of 3GPP TS 36.212 V10.4.0 (2011-12) "Evolved Universal Terrestrial Radio Access (E-UTRA); Multiplexing and channel coding (Release 10)".

Data bits $a_0, a_1, \ldots, a_{A-1}$ are given in the form of one transport block every TTI. First, cyclic redundancy check (CRC) parity bits $p_0, p_1, \ldots, p_{L-1}$ are granted to the data bits $a_0, a_1, \ldots, a_{A-1}$ to generate CRC additional bits $b_0, b_1, \ldots, b_{B-1}$. Herein, B=A+L.

The CRC additional bits $b_0, b_1, \ldots, b_{B-1}$ are split by the unit of a code block and the CRC parity bits are gain granted by the unit of the code block. A bit sequence output after code block segmentation is referred to as $c_{r0}, c_{r1}, \ldots, c_{r(Kr-1)}$. Herein, when the total number of code blocks is C, r represents a code block number and Kr represents the number of bits for the code block number r.

Channel coding is performed with respect to a bit sequence for a given code block. Encoded bits are represented as $d^{(i)}_{r0}, d^{(i)}_{r1}, \ldots, d^{(i)}_{r(D-1)}$, D represents the number of bits encoded per output stream, and i represents an index of an encoder output bit stream.

Rate matching is performed with respect to the encoded bits and code block concatenation is performed to generate a data bit sequence $f_0, f_1, \ldots, f_{G-1}$. Herein, G represents the total number of encoded bits used for transmission except for bits used for transporting control information when the control information is multiplexed on the PUSCH.

<Uplink Reference Signal>

Hereinafter, the uplink reference signal will be described.

The reference signal is generally transported in sequence. As the sequence of the reference signal, a predetermined sequence may be used without a particular limit. As the reference signal sequence, a sequence (PSK-based computer generated sequence) generated through a phase shift keying (PSK) based computer may be used. Examples of the PSK include binary phase shift keying (BPSK), quadrature phase shift keying (QPSK), and the like. Alternatively, as the reference signal sequence, a constant amplitude zero auto-correlation (CAZAC) sequence may be used. Examples of the CAZAC sequence include a zadoff-chu (ZC) based sequence, a ZC sequence with cyclic extension, a ZC sequence with truncation, and the like. Alternatively, as the reference signal sequence, a pseudo-random (PN) sequence may be used. Examples of the PN sequence include an m-sequence, a sequence generated through the computer, a gold sequence, a Kasami sequence, and the like. Further, as the reference signal sequence, a cyclically shifted sequence may be used.

The uplink reference signal may be divided into the demodulation reference signal (DMRS) and the sounding reference signal (SRS). The DMRS is a reference signal used in the channel estimation for demodulating a received signal. The DMRS may be associated with transmission of a PUSCH or PUCCH. The SRS is a reference signal which the terminal transmits to a base station for uplink scheduling.

The base station estimates an uplink channel through the received sounding reference signal and uses the estimated uplink channel in the uplink scheduling. The SRS is not associated with transmission of the PUSCH or PUCCH. The same type of primary sequence may be used for the DMRS and the SRS. Meanwhile, precoding applied to the DMRS in uplink multi-antenna transmission may be the same as precoding applied to the PUSCH. Cyclic shift separation is a primary scheme that multiplexes the DMRS. In the 3GPP LTE-A system, the SRS may not be precoded and further, may an antenna specific reference signal.

The reference signal sequence $r_{u,v}^{(\alpha)}(n)$ may be defined based on a primary sequence $b_{u,v}(n)$ and a cyclic shift $\alpha$ by an equation given below.

$$r_{u,v}^{(\alpha)}(n) = e^{j\alpha n} b_{u,v}(n), \quad 0 \leq n < M_{sc}^{RS} \quad \text{[Equation 1]}$$

In Equation 1, $M_{sc}^{RS} = m \cdot N_{sc}^{RB}$ ($1 \leq M \leq N_{RB}^{max,UL}$) represents the length of the reference signal sequence. $N_{sc}^{RB}$ represents the size of a resource block represented by the number of subcarriers in the frequency domain and $N_{RB}^{max,UL}$ represents a maximum value of an uplink bandwidth represented by the multiple of $N_{sc}^{RB}$. A plurality of reference signal sequences may be defined by differently applying $\alpha$ which is the cyclic shift value from one primary sequence.

The primary sequence $b_{u,v}(n)$ is divided into a plurality of groups and in this case, $u \in \{0, 1, \ldots, 29\}$ represents a group number and v represents a primary sequence number in a group. The primary sequence depends on the length ($M_{sc}^{RS}$) of the primary sequence. Each group includes one primary sequence (v=0) in which the length is $M_{sc}^{RS}$ with respect to m of $1 \leq m \leq 5$ and includes two primary sequences (v=0, 1) in which the length is $M_{sc}^{RS}$ with respect to m of $6 \leq m \leq n_{RB}^{max,UL}$. A sequence group number u and a primary sequence number v in the group may vary depending on a time like group hopping or sequence hopping.

When the length of the reference signal sequence is $3N_{sc}^{RB}$ or more, the primary sequence may be defined by an equation given below.

$$b_{u,v}(n) = x_q(n \bmod N_{ZC}^{RS}), \quad 0 \leq n < M_{sc}^{RS} \quad \text{[Equation 2]}$$

In the above equation, q represents a root index of a Zadoff-Chu (ZC) sequence. $N_{ZC}^{RS}$ represent the length of the ZC sequence may be given as a prime number smaller than $M_{sc}^{RS}$. The ZC sequence having the root index of q may be defined by Equation 4.

$$x_q(m) = e^{-j\frac{\pi q m(m+1)}{N_{ZC}^{RS}}}, \quad 0 \leq m \leq N_{ZC}^{RS} - 1 \quad \text{[Equation 3]}$$

In the above equation, q may be given by an equation given below.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{[Equation 4]}$$

When the length of the reference signal sequence is $3N_{sc}^{RB}$ or less, the primary sequence may be defined by an equation given below.

$$b_{u,v}(n) = e^{j\phi(n)\pi/4}, \quad 0 \leq n \leq M_{sc}^{RS} - 1 \quad \text{[Equation 5]}$$

A table given below shows an example in which $\varphi(n)$ is defined when $M_{sc}^{RS} = N_{sc}^{RB}$.

TABLE 3

| | $\varphi(0), \ldots, \varphi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

A table given below shows an example in which $\varphi(n)$ is defined when $M_{sc}^{RS} = 2 \cdot N_{sc}^{RB}$.

TABLE 4

| | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |

TABLE 4-continued

| | | | | | | | | | | φ(0), . . . , φ(23) | | | | | | | | | | | | | |
|---|---|---|---|---|---|---|---|---|---|---|---|---|---|---|---|---|---|---|---|---|---|---|---|
| 14 | −3 | −3 | 3 | 1 | 3 | 1 | −3 | 3 | 1 | 3 | 1 | 1 | 3 | 3 | −1 | −1 | −3 | 1 | −3 | −1 | 3 | 1 | 1 | 3 |
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| 16 | −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | 1 | −1 | −1 | 3 | 3 | −3 | −1 | 1 | −3 |
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

Hopping of the reference signal may be applied as described below.

A sequence group number u of slot $n_s$ may be defined based on a group hopping pattern $f_{gh}(n_s)$ and a sequence shift pattern $f_{ss}$ by an equation given below.

$$u=(f_{gh}(n_s)+f_{ss})\bmod 30 \quad \text{[Equation 6]}$$

17 different group hopping patterns and 30 different sequence shift patterns may exist. Group hopping may be applied or not applied by a group-hopping-enabled parameter which is a cell specific parameter provided by the higher layer. Further, the group hopping for the PUSCH may not be applied to specific UE by a disable-sequence-group-hopping parameter which is a UE specific parameter. The PUCCH and the PUSCH may have the same group hopping pattern and different sequence shift patterns.

The group hopping pattern $f_{gh}(n_s)$ is the same with respect to the PUSCH and the PUCCH and may be defined by an equation given below.

$$f_{gh}(n_s) = \begin{cases} 0 & \text{if group hopping is disabled} \\ \left(\sum_{i=0}^{7} c(8n_s+i)\cdot 2^i\right)\bmod 30 & \text{if group hopping is enabled} \end{cases} \quad \text{[Equation 7]}$$

In the above equation, c(i) as an imitation pseudo-random sequence which is a PN sequence may be defined by a gold sequence having a length of −31. An equation given below shows one example of the gold sequence c(n).

$$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_1(n+1)+x_1(n))\bmod 2 \quad \text{[Equation 8]}$$

Herein, Nc=1600, $x_1(i)$ represents a 1 m-th sequence, and $x_2(i)$ represents a 2 m-th sequence. An imitation pseudo-number sequence generator may be initialized to $$c_{init} = \left\lfloor \frac{N_{ID}^{cell}}{30} \right\rfloor$$

at the beginning of each radio frame.

Definition of the sequence shift pattern $f_{ss}$ may be different with respect to the PUCCH and the PUSCH. The sequence shift pattern of the PUCCH may be given as $f_{ss}^{PUCCH}=N_{ID}^{cell} \bmod 30$. The sequence shift pattern of the PUSCH may be given as $f_{ss}^{PUSCH}=(f_{ss}^{PUCCH}+\Delta_{ss})\bmod 30$ and $\Delta_{ss} \in \{0, 1, \ldots, 29\}$ may be configured by the higher layer.

The sequence hopping may be applied only a reference signal sequence having a length longer than $6N_{sc}^{RB}$. With respect to a reference signal sequence having a length shorter than $6N_{sc}^{RB}$, the primary sequence number is given as v=0 in the primary sequence group. With respect to the reference signal sequence having the length longer than $6N_{sc}^{RB}$, the primary sequence number v in the primary sequence group in slot $n_s$ may be defined by Equation 10.

$$v = \begin{cases} c(n_s) & \text{if group hopping is disabled and sequence hopping is enabled} \\ 0 & \text{otherwise} \end{cases} \quad \text{[Equation 9]}$$

c(i) may be expressed by an example of Equation 9 given above. The sequence hopping may be applied or not applied by a sequence-hopping-enabled parameter which is a cell specific parameter provided by the higher layer. Further, the sequence hopping for the PUSCH may not be applied to specific UE by the disable-sequence-group-hopping parameter which is the UE specific parameter. The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

A PUSCH DMRS sequence $r_{PUSCH}^{(\lambda)}(\cdot)$ depending on a layer $\lambda(0, 1, \ldots, \gamma-1)$ may be defined by Equation 11.

$$r_{PUSCH}^{(\lambda)}(m \cdot M_{sc}^{RS}+n)=w^{(\lambda)}(m)r_{u,v}^{(\alpha_\lambda)}(n) \quad \text{[Equation 10]}$$

In the above equation, m=0, 1, ... and n=0, ..., $M_{sc}^{RS}-1$. $M_{sc}^{RS}=M_{sc}^{PUSCH}$. An orthogonal sequence $w^{(\lambda)}(m)$ may be determined according to a table to be described below.

In the slot $n_s$, the cyclic shift may be given as $\alpha=2\pi n_{cs}/12$ and $n_{cs}$ may be defined by an equation given below.

$$n_{cs,\lambda}=(n_{DMRS}^{(1)}+n_{DMRS,\lambda}^{(2)}+n_{PN}(n_s))\bmod 12 \quad \text{[Equation 11]}$$

In the above equation, $n^{(1)}_{DMRS}$ may be determined according to a cyclicShift parameter provided by the higher layer. A table given below shows an example of $n^{(1)}_{DMRS}$ determined according to the cyclicShift parameter.

TABLE 5

| Parameter | $n^{(1)}_{DMRS}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Referring back to the above equation, $n^{(2)}_{DMRS,\lambda}$ may be determined by a DMRS cyclic shift field in DCI format 0 for the transport block depending on corresponding PUSCH transmission. A table given below shows an example of $n^{(2)}_{DMRS,\lambda}$ determined according to DMRS cyclic shift field.

TABLE 6

| DMRS cyclic shift field | $n^{(2)}_{DMRS,\lambda}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

$n_{PN}(n_s)$ may be defined by an equation given below.

$$n_{PN}(n_s) = \sum_{i=0}^{7} c(8N_{symb}^{UL} \cdot n_s + i) \cdot 2^i \quad \text{[Equation 12]}$$

c(i) may be expressed by the example of Equation 8 given above and applied for each cell of c(i). The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

The vector of the reference signal may be precoded by an equation given below.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(\upsilon-1)} \end{bmatrix} \quad \text{[Equation 13]}$$

In the above equation, P represents the number of antenna ports used for the PUSCH transmission. W represents a precoding matrix. With respect to PUSCH transmission using a single antenna port, P=1, W=1, and γ=1. Further, with respect to spatial multiplexing, P=2 or 4.

With respect to each antenna port used for the PUSCH transmission, the DMRS sequence is multiplied by an amplitude scaling factor $\beta_{PUSCH}$ and sequentially mapped to the resource block. A set of physical resource blocks used for the mapping is the same as the set of physical resource blocks used for the PUSCH transmission. In the subframe, the DMRS sequence may be first mapped to the resource element in a direction in which the DMRS sequence increases in the frequency domain and thereafter, in a direction in which the slot number increases. The DMRS sequence may be mapped to a fourth SC-FDMA symbol (SC-FDMA symbol 3) in the case of the normal CP and a third SC-FDMA symbol (SC-FDMA symbol 2) in the case of the extension CP.

Figure 8A:
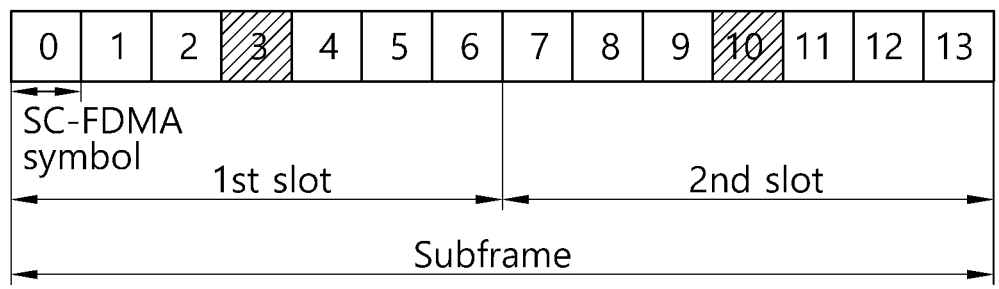
FIGS. 8a and 8b illustrate one example of a subframe in which a DMRS for a PUSCH is transmitted.
Figure 8A:
Figure 8B:
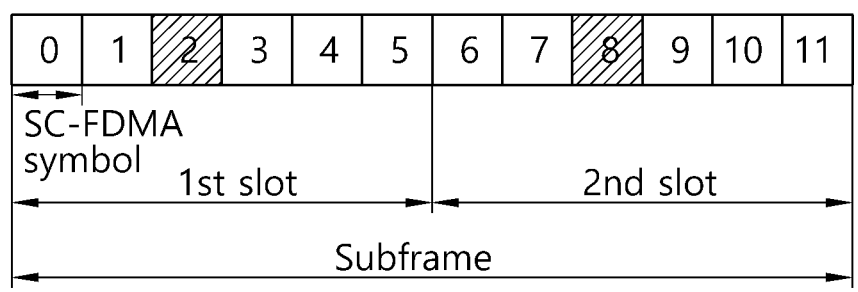
Figure 8B:

FIGS. 8 and 8b Illustrate One Example of a Subframe in which a DMRS for a PUSCH is Transmitted.

The structure of the subframe in FIG. 8a shows a case of the normal CP. The subframe includes a first slot and a second slot. Each of the first slot and the second slot includes 7 SC-FDMA symbols. Symbol indexes of 0 to 13 are granted to 14 SC-FDMA symbols in the subframe. The reference signal may be transmitted through the SC-FDMA symbols having symbol indexes 3 and 10. The reference signal may be transmitted by using the sequence. The Zadoff-Chu (ZC) sequence may be used as the reference signal sequence and various ZC sequences may be generated according to a root index and a cyclic shift value. The base station allocates different cyclic shift values to the terminal to estimate channels of a plurality of terminals through an orthogonal sequence or quasi-orthogonal sequence. Locations of the frequency domains occupied by the reference signal in may be the same as each other or different from each other in two slots in the subframe. In two slots, the same reference signal sequence is used. Data may be transmitted through the residual SC-FDMA symbols other than the SC-FDMA symbol in which the reference signal is transmitted.

The structure of the subframe in FIG. 8b shows a case of the extension CP. The subframe includes the first slot and the second slot. Each of the first slot and the second slot includes 6 SC-FDMA symbols. Symbol indexes of 0 to 11 are granted to 12 SC-FDMA symbols in the subframe. The reference signal is transmitted through the SC-FDMA symbols having symbol indexes 2 and 8. The data is transmitted through the residual SC-FDMA symbols other than the SC-FDMA symbol in which the reference signal is transmitted.

<Carrier Aggregation>

Hereinafter, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

As described above, the carrier aggregation system may support a plurality of component carriers (CC), that is, a plurality of serving cells unlike a single carrier system.

The carrier aggregation system may support cross-carrier scheduling. The cross-carrier scheduling is a scheduling method that may perform resource allocation of the PDSCH transmitted through another component carrier through the PDCCH transmitted through a specific component carrier and/or resource allocation of the PUSCH transmitted through other component carrier other than the component carrier fundamentally linked with the specific component carrier.

<Machine Type Communication (MTC)>

Meanwhile, hereinafter, the MTC will be described.

Figure 9A:
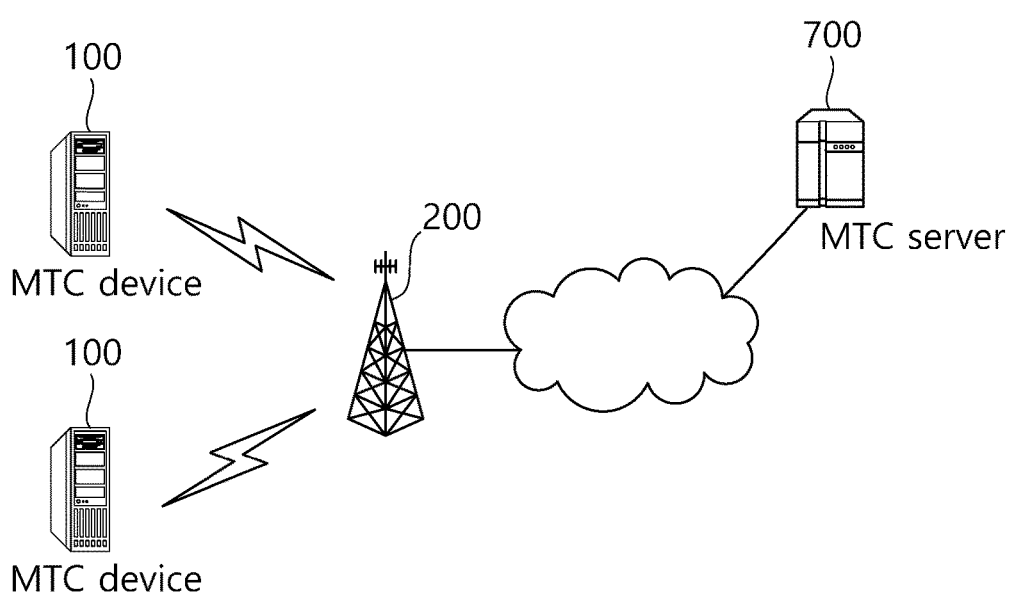
FIG. 9a illustrates an example of the machine type communication (MTC).

FIG. 9a Illustrates an Example of the Machine Type Communication (MTC).

The machine type communication (MTC) represents information exchange through between MTC devices 100 through a base station 200 or information exchange between the MTC device 100 and an MTC server 700 through the base station, which does not accompany human interaction.

The MTC server 700 is an entity which communicates with the MTC device 100. The MTC server 700 executes an MTC application and provides an MTC specific service to the MTC device.

The MTC device 100 as a wireless device providing the MTC may be fixed or mobile.

The service provided through the MTC has discrimination from a service in communication in which human intervenes in the related art and includes various categories of services including tracking, metering, payment, a medical field service, remote control, and the like. In more detail, the service provided through the MTC may include electric meter reading, water level measurement, utilization of a monitoring camera, reporting of an inventory of a vending machine, and the like As peculiarities of the MTC device, since a transmission data amount is small and uplink/downlink data transmission/reception often occurs, it is efficient to decrease manufacturing cost of the MTC device and reduce battery consumption according to the low data transmission rate. The MTC device is characterized in that mobility is small, and as a result, the MTC device is characterized in that a channel environment is not almost changed.

Meanwhile, the MTC is also called Internet of Things (IoT). Accordingly, the MTC device may be called an IoT device.

Figure 9B:
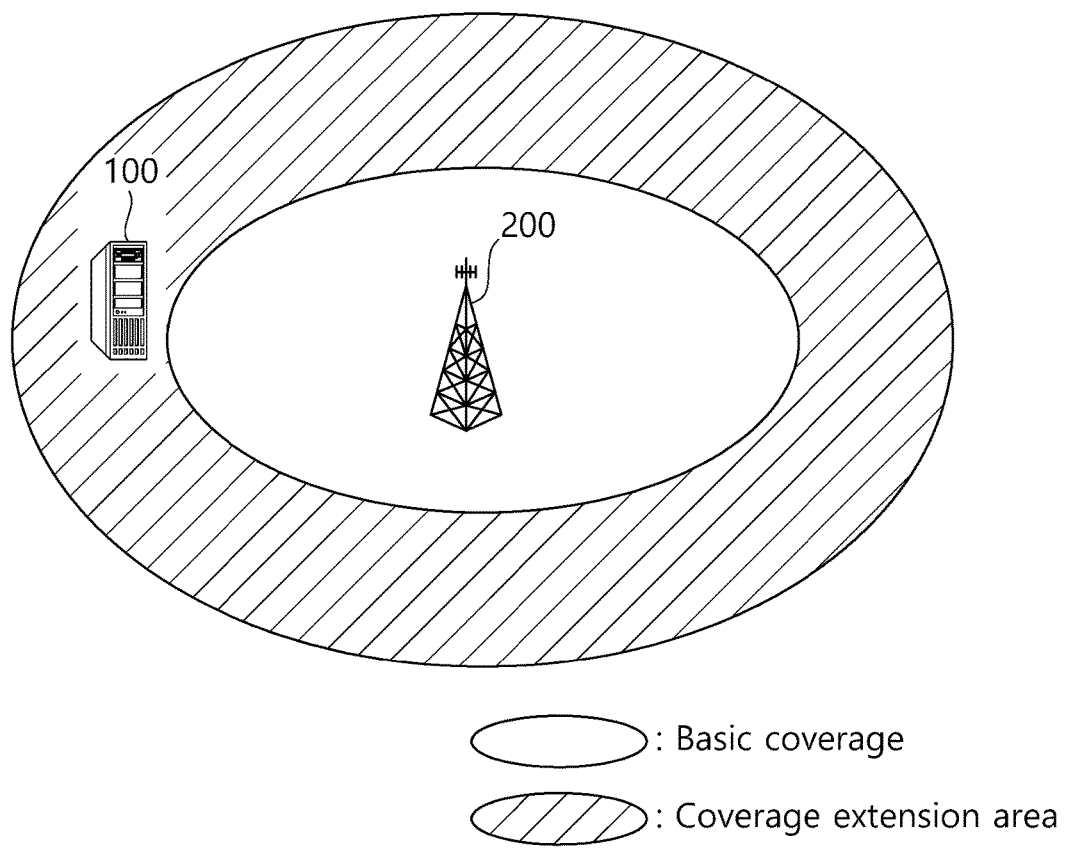
FIG. 9b illustrates an example of cell coverage extension for an MTC device.

FIG. 9b Illustrates an Example of Cell Coverage Extension for an MTC Device.

In recent years, it is considered that cell coverage of the base station extends for the MTC device 100 and various techniques for the cell coverage extension are discussed.

However, in the case where the coverage of the cell extends, when the base station transmits a downlink channel to the MTC device positioned in the coverage extension area, the MTC device undergoes a difficulty in receiving the downlink channel.

Figure 9C:
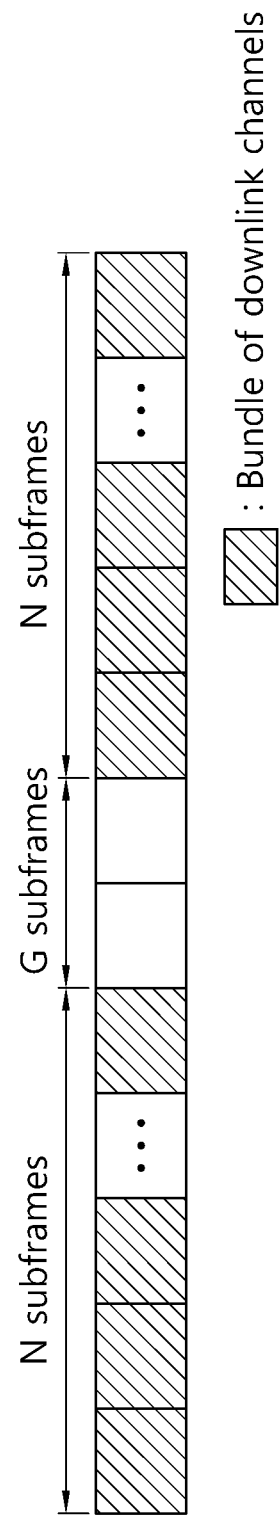
FIG. 9c is an exemplary diagram illustrating an example of transmitting a bundle of downlink channels.

FIG. 9c is an Exemplary Diagram Illustrating an Example of Transmitting a Bundle of Downlink Channels.

As known with reference to FIG. 9c, the base station repeatedly transmits the downlink channel (for example, the PDCCH and/or PDSCH) to the MTC device positioned in the coverage extension area on multiple subframes (for example, N subframes). As described above, the downlink channels which are repeated on the multiple subframes are called a bundle of the downlink channels.

Meanwhile, the MTC device receives the bundle of the downlink channels on the multiple subframes and decodes a part or the entirety of the bundle to increase decoding success rate.

Meanwhile, the MTC device positioned in the coverage extension area may also transmit the bundle of the uplink channels (for example, the PUCCH and/or PUSCH) to the base station on the multiple subframes similarly.

Figure 10A:
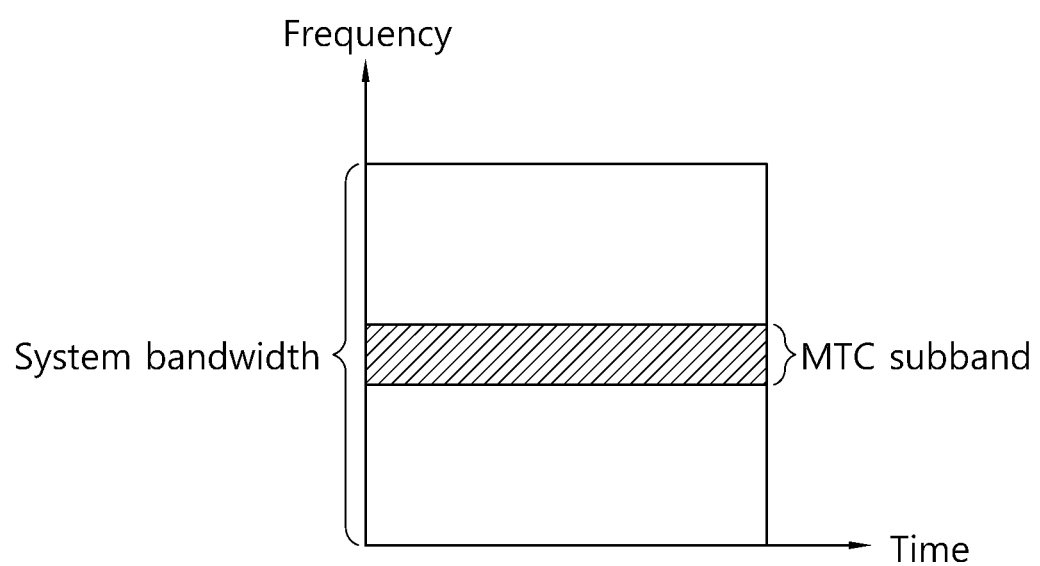
FIGS. 10a and 10b are exemplary diagrams illustrating an example of a subband in which the MTC device operates.
Figure 10B:
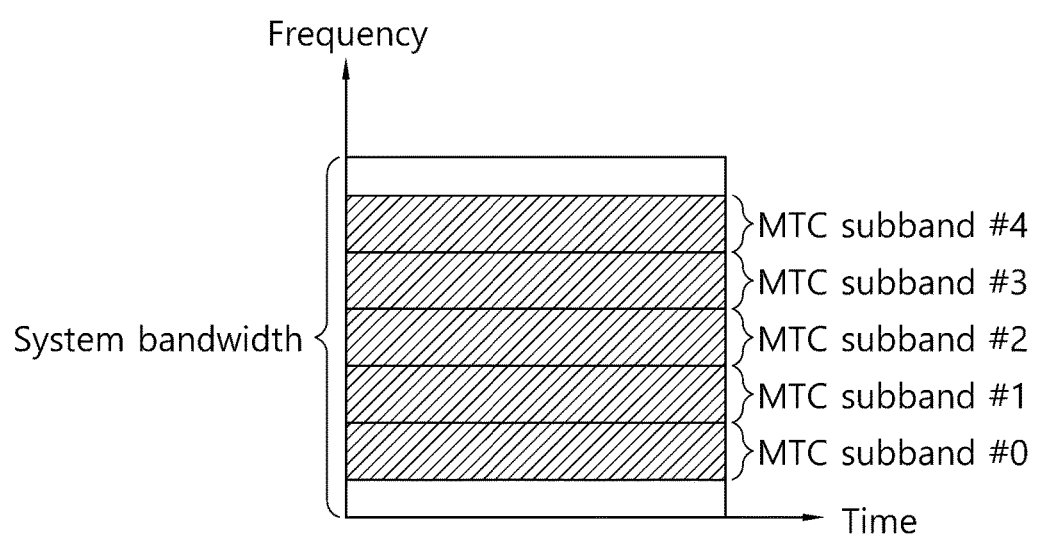

FIGS. 10a and 10b are Exemplary Diagrams Illustrating an Example of a Subband in which the MTC Device Operates.

As one method for low cost of the MTC device, the MTC device may use a subband at, for example, approximately 1.4 MHz regardless of a system bandwidth of the cell as illustrated in FIG. 10a.

In this case, an area of the subband in which the MTC device operates may be positioned at a central area (for example, 6 central PRBs) of the system bandwidth of the cell as illustrated in FIG. 10a.

Alternatively, as illustrated in FIG. 10b, multiple subbands of the MTC device are provided in one subframe for multiplexing of the MTC devices in the subframe, and as a result, the MTC devices may have different subbands. In this case, a majority of MTC devices may have other subbands other than the central area (for example, 6 central PRBs) of the system band of the cell.

On the other hand, when the amount of uplink traffic to be transmitted by the MTC device, it may be efficient for the base station to set only a band smaller than the subband illustrated in FIGS. 10a and 10b, for example, a band (frequency area) having a size equal to or smaller than one RB for the MTC device. This will be described with reference to FIGS. 11a and 11b.

Figure 11A:
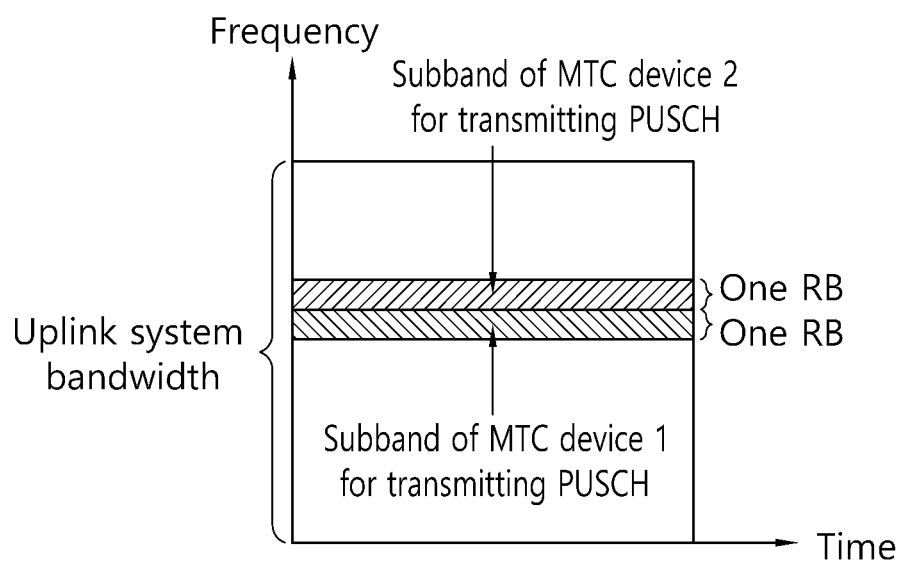
FIG. 11a illustrates an example of setting a subband of the MTC device to the size of one RB and FIG. 11b illustrates an example of setting the subband of the MTC device to the size of a ½ RB.
Figure 11B:
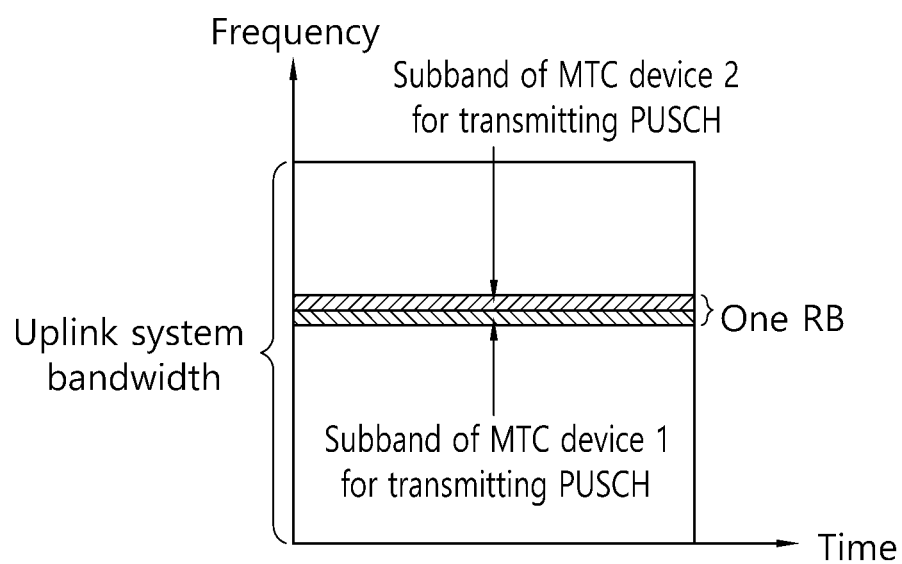

FIG. 11a Illustrates an Example of Setting a Subband of the MTC Device to the Size of One RB and FIG. 11b Illustrates an Example of Setting the Subband of the MTC Device to the Size of a ½ RB.

As known with reference to FIG. 11a, the subband having the size of one RB may be set for MTC device 1 and MTC device 2 for the PUSCH transmission.

Further, as known with reference to FIG. 11b, one RB may be separately set for MTC device 1 and MTC device 2.

As described above, when the amount of uplink traffic is small, it may be considered that the MTC device transmits uplink data by using a resource in the frequency area smaller than one RB. In this case, the PUSCH transmitted throughout one RB is transmitted by using the resource (for example, 0.5 PRBs or 6 subcarriers) in the frequency area smaller than one RB with the same transmission power to transmit the PUSCH by using a smaller quantity of resources while reducing transmission performance of the PUSCH. When such a technique is used, a plurality of MTC devices may transmit the PUSCH through one PRB resource as illustrated in FIG. 11b, and as a result, it may be advantageous in terms of multiplexing.

However, by the technique in the related art, there is no method in which the MTC device may transmit the PUSCH by using only one PRB or one or less of PRB.

Moreover, there is no method that may transmit even the demodulation reference signal (DMRS) transmitted so as for the base station to correctly demodulate the PUSCH transmitted by the MTC device in the related art by using only one PRB or one or less of PRB.

<Disclosure of Present Specification>

Accordingly, the disclosure of the present specification presents the method in which the MTC device may transmit the PUSCH by using only one PRB or one or less of PRB. Further, the disclosure of the present specification presents the method that transmits the DMRS for demodulating the PUSCH by using only one PRB or one or less of PRB.

The method that transmits the channel by using the resource in the frequency area smaller than one PRB may be applied even to the transmission of the PUCCH.

In detail, the present specification presents a method that uses resources less than 1 PRB and transmits the PUSCH on a plurality of subframes when the amount of the uplink traffic to be transmitted by the MTC device requiring the coverage extension is small.

A PUSCH transmission technique proposed by the present specification may be used for 1) a purpose for transmitting the same amount of data at lower code rate on the plurality of subframes or 2) a purpose for power-boosting and transmitting the same amount of data through the frequency resource equal to or smaller than one PRB.

For the purpose of 1), the MTC device intends to transmit data (that is, transport block) of A bits by using, for example, one PRB, but transmits the data of A bits on N subframes to decrease the code rate when the code rate may not be sufficiently low.

For the purpose of 2), when the MTC device, for example, intends to transmit the data (transport block) through one PRB, but may not power-boost the data, the MTC device transmits the corresponding data on N subframes by using the same code rate as the case of transmitting the data through one PRB instead of using a sub-PRB area as many as 1/N PRB to perform the power boosting.

Two situations given above may be normalized as below. The number of RPB for calculation of a TB size of the UL-SCH and transport block processing illustrated in FIG. 7 will be referred to as 'reference PRB number' and the number of PRBs and the number of subframes in which the transport block is transmitted will be referred to as 'transmitted PRB number' and 'transmitted subframe number', respectively. In this case, the MTC device may transmit transport blocks generated through M PRB which is the 'reference PRB number' on N transmission subframes and transmit the transport block by using M/N PRBs on each subframe.

Herein, M may be 1. In this case, the 'reference PRB number' is 1 (that is, M=1), the 'transmitted PRB number' is 1/N PRB (that is, 12/N subcarriers), and the 'transmitted subframe number' becomes N subcarriers. Further, characteristically, M/N may be 1. That is, M may be N and in this case, the 'reference PRB number' is N, the 'transmitted PRB number' is 1 PRB, and the 'transmitted subframe number' becomes N subcarriers.

However, hereinafter, for easy description, contents of the present invention will be described based on the case where the 'reference PRB number' is 1 (that is, M=1), the 'transmitted PRB number' is 1/N PRB (that is, 12/N subcarriers), and the 'transmitted subframe number' becomes N subcarriers. However, the contents of the present invention may extended and similarly applied even to the case where the 'reference PRB number' is M or M=N.

Hereinafter, the disclosure of the present invention will be described in detail for each section. However, hereinafter, for easy description, it is primarily described that the MTC device or the MTC device requiring the coverage extension transmits the PUSCH, but the contents/spirit of the present specification may be applied to other UE, of course. Further, for easy description, hereinafter, a resource mapping method for transmitting the PUSCH on the plurality of subframes while using the resources less than one PRB when the amount of the uplink traffic to be transmitted by the MT device requiring the coverage extension is small will be primarily described, but the description may be applied even to the transmission of the PUCCH. In addition, the description may be applied even to, for example, transmission of PDSCH or (E)PDCCH.

I. PUSCH Transmission Method 1

One method for transmitting the transport block generated based on one PRB on N subframes through 1/N PRB may be described below.

Figure 12:
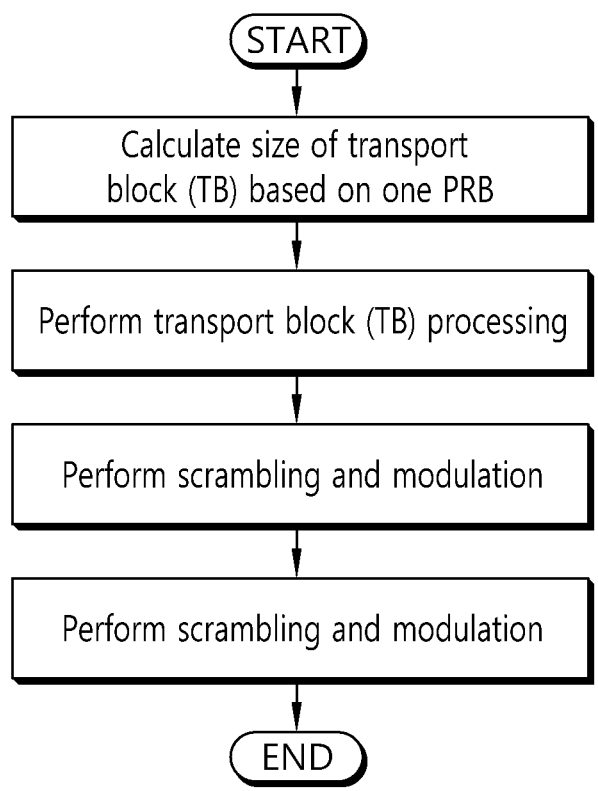
FIG. 12 is a flowchart illustrating PUSCH transmission method 1 presented by the present specification.

FIG. 12 is a Flowchart Illustrating PUSCH Transmission Method 1 Presented by the Present Specification.

Referring to FIG. 12, the MTC device calculates the TB size of the UL-SCH based on one PRB. Subsequently, the MTC device similarly performs the transport block processing illustrated in FIG. 7. Thereafter, the MTC device performs scrambling and modulation procedures and performs resource mapping of symbols output through the scrambling and modulation procedures according to the 'transmitted PRB number' and the 'transmitted subframe number'.

Figure 13A:
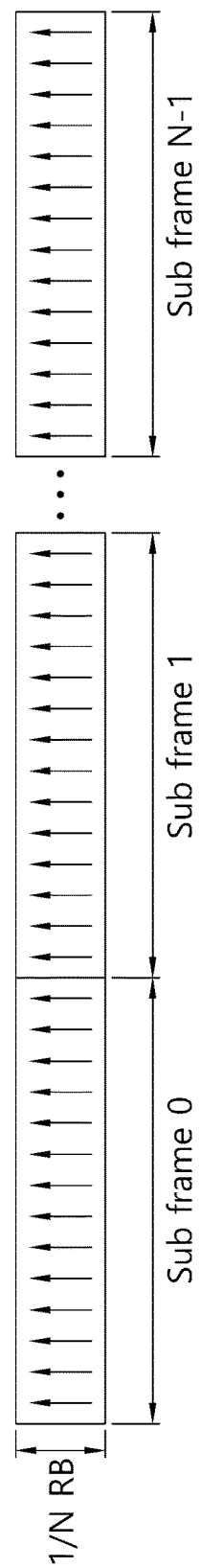
FIG. 13a is a flowchart illustrating an example of resource mapping according to PUSCH transmission method 1 presented by the present specification.

FIG. 13a is a Flowchart Illustrating an Example of Resource Mapping According to PUSCH Transmission Method 1 Presented by the Present Specification.

As illustrated in FIG. 13a, symbols modulated after rate-matching are mapped to resources of 1/N PRB (12/N subcarriers)×N subframes (14×N SC-FDMA symbols) in the order of subframes 0, 1, ..., N−1. In this case, the mapping may be performed in a direction in which the subcarrier index first increases and thereafter, the SC-FDMA symbol index increases.

In this case, the resource location where the DMRS is transmitted may be excluded from mapping of the PUSCH. That is, the resource location where the DMRS is transmitted may be excluded when the PUSCH is rate-matched.

In this case, the base station that receives the corresponding PUSCH may need to receive all N subframes in which the PUSCH is transmitted in order to decode the PUSCH for one transport block transmitted by the MTC device.

Meanwhile, PUSCH transmission method 1 may be applied even to the case where the transport block generated based on N PRBs is transmitted on N subframes through one PRB. For example, PUSCH transmission method 1 will be described below with reference to FIG. 13b.

Figure 13B:
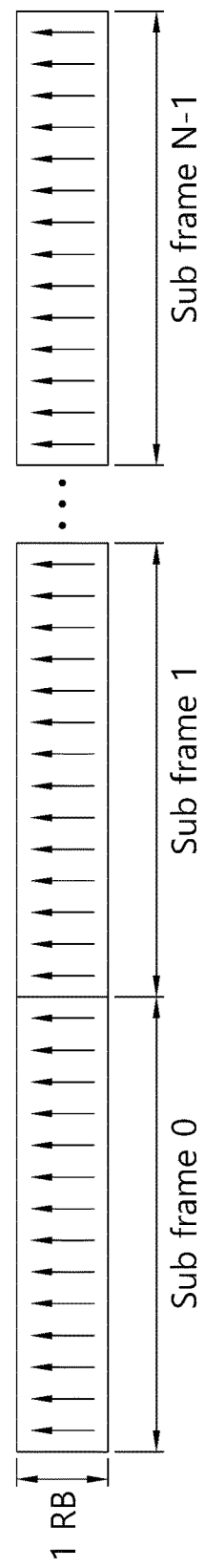
FIG. 13b illustrates another example in which a resource is mapped according to PUSCH transmission method 1 presented by the present specification.

FIG. 13b Illustrates Another Example of Resource Mapping According to PUSCH Transmission Method 1 Presented by the Present Specification.

As illustrated in FIG. 13a, the symbols modulated after rate-matching are mapped to resources of one PRB×N subframes (14×N SC-FDMA symbols) in the order of subframes 0, 1, ..., N−1. In this case, the mapping may be performed in the direction in which the subcarrier index first increases and thereafter, the SC-FDMA symbol index increases.

II. PUSCH Transmission Method 2

Another method for transmitting the transport block generated based on one PRB on N subframes through 1/N PRB may be described below.

First, the MTC device calculates the TB size of the UL-SCH based on one PRB similarly to PUSCH transmission method 1 illustrated in FIG. 12. Subsequently, the MTC device similarly performs the transport block processing illustrated in FIG. 7. Thereafter, the MTC device performs the scrambling and modulation procedures and performs the resource mapping of symbols output through the scrambling and modulation procedures according to the 'transmitted PRB number' and the 'transmitted subframe number'.

In this case, according to PUSCH transmission method 2, the MTC device may perform the PUSCH based on one PRB. This will be described below with reference to drawings.

Figure 14A:
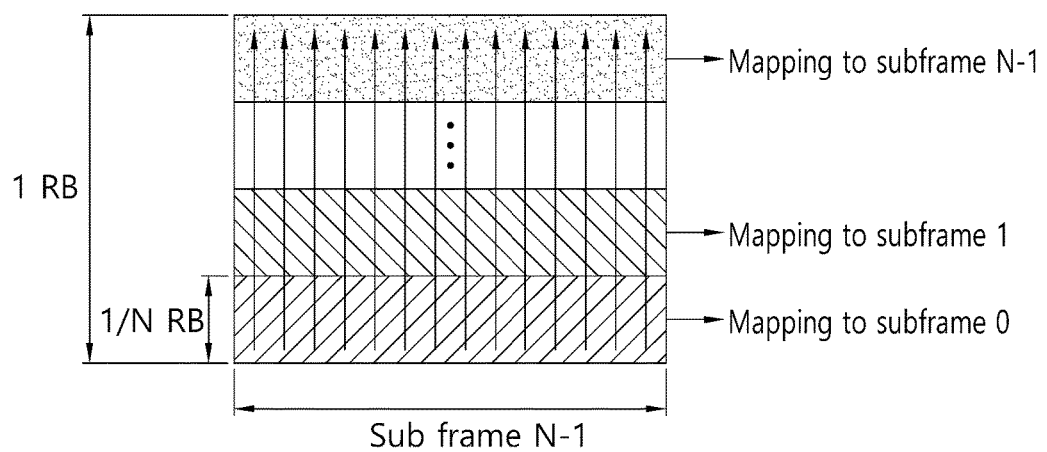
Figure 14B:
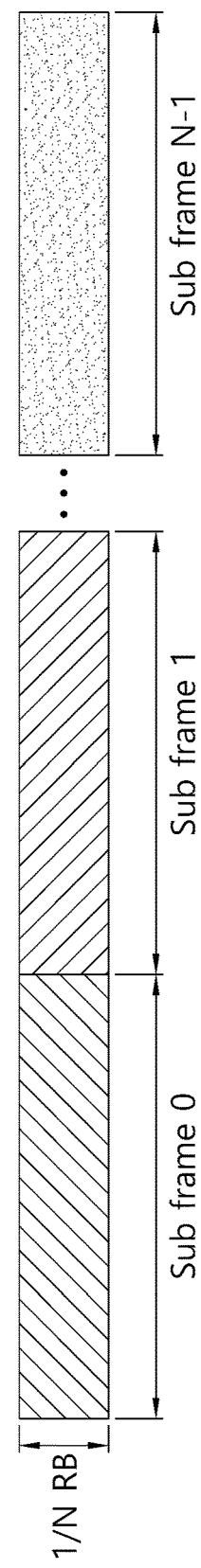

FIGS. 14a to 14c Illustrate an Example of Resource Mapping According to PUSCH Transmission Method 2 Presented by the Present Specification.

Referring to FIG. 14a, the MTC device may perform mapping of the PUSCH based on one PRB differently from PUSCH transmission method 1. Next, as known with reference to FIG. 14b, the MTC device may transmit each sub-PRB area on different subframes. That is, the MTC device may divide the mapped PUSCH and sequentially transmit the mapped PUSCH on the plurality of subframes (for example, N subframes) by assuming one PRB.

When the transport block is mapped as described above, the MTC device may the symbols modulated after the rate-matching are mapped to the resources of 1/N RBs (that is, 12/N subcarriers)×N subframes in a direction in which each index increases in the order of a subcarrier index, a subframe index, and an SC-FDMA symbol index. That is, when a k-th subcarrier of subframe i and RE positioned at an l-th SC-FDMA symbol are written as $x_i^{k,l}$, in the case where the transport block is mapped, the symbols modulated after the rate-matching may be consequently mapped in the order of $x_0^{0,0}, x_0^{1,0}, \ldots, x_0^{(12/N)-1,0}, x_1^{0,0}, \ldots, x_1^{(12/N)-1,0}, \ldots, x_{N-1}^{0,0}, x_{N-1}^{1,0}, \ldots, x_{N-1}^{(12/N)-1,0}, x_0^{0,1}, x_0^{1,1}, \ldots, x_0^{(12/N)-1,1}, x_1^{0,1}, x_1^{1,1}, \ldots, x_1^{(12/N)-1,1}, \ldots, x_{N-1}^{0,1}, x_{N-1}^{1,1}, \ldots, x_{N-1}^{(12/N)-1,1}, \ldots, x_0^{0,13}, x_0^{1,13}, \ldots, x_0^{(12/N)-1,13}, x_0^{0,13}, x_0^{1,13}, \ldots, x_1^{(12/N)-1,13}, \ldots, x_{N-1}^{0,13}, x_{N-1}^{1,13}, \ldots, x_{N-1}^{(12/N)-1,13}$.

On the other hand, as another method for the MTC device to transmit the transport block generated based on one PRB on N subframes through 1/N RB, the PUSCH is mapped based on one PRB as illustrated in FIG. 14a and thereafter, each sub-PRB area is transmitted through different subframes and a frequency resource location in which the PUSCH of the sub-PRB area is transmitted on each subframe may be the same as the frequency resource location when the PUSCH is mapped based on one PRB as illustrated in FIG. 14c.

That is, when the transport block is mapped, in the case where the symbols modulated after the rate-matching are consequently mapped on the plurality of subframes, when the k-th subcarrier of subframe i and the RE positioned at the 1-th SC-FDMA symbol are written as $x_i^{k,l}$, the symbols modulated after the rate-matching may be consequently mapped in the order of $x_0^{0,0}, x_0^{1,0}, \ldots, x_0^{(12/N)-1,0}, x_1^{(12/N),0}, x_1^{(12/N)+1,0}, \ldots, x_1^{2(12/N)-1,0}, \ldots, x_{N-1}^{(N-1)(12/N),0}, x_{N-1}^{(N-1)(12/N)+1,0}, \ldots, x_{N-1}^{N(12/N)-1,0}, x_0^{0,1}, x_0^{1,1}, \ldots, x_0^{(12/N)-1,1}, x_1^{(12/N),1}, x_1^{(12/N)+1,1}, \ldots, x_1^{2(12/N)-1,1}, \ldots, x_{N-1}^{(N-1)(12/N),1}, x_{N-1}^{(N-1)(12/N)+1,1}, \ldots, x_{N-1}^{N(12/N)-1,1}, \ldots, x_0^{0,13}, x_0^{1,13}, \ldots, x_0^{(12/N)-1,13}, x_1^{(12/N),13}, x_1^{(12/N)+1,13}, \ldots, x_1^{2(12/N)-1,13}, \ldots, x_{N-1}^{(N-1)(12/N),13}, x_{N-1}^{(N-1)(12/N)+1,13}, \ldots, x_{N-1}^{N(12/N)-1,13}$.

In this case, the resource location where the DMRS is transmitted may be excluded from the mapping (rate-matching) of the PUSCH.

In this case, the base station that receives the corresponding PUSCH may need to receive all N subframes in which the PUSCH is transmitted in order to decode the PUSCH for one transport block transmitted by the MTC device. The reason is that bits which undergo the transport block processing procedure illustrated in FIG. 7 are transmitted on N subframes. The proposed technique may be the same as a type in which the PUSCH to be transmitted through one PRB is transmitted through a specific sub-PRB area of different subframes for each sub-PRB. That is, the PUSCH to be transmitted to an n-th sub-PRB area is transmitted through the specific sub-PRB area of the n-th subframe. Accordingly, the base station interprets the PUSCH which the MTC device transmits on each subframe as being transmitted through each associated sub-PRB area to decode the PUSCH.

III. PUSCH Transmission Method 3

As yet another method which may be considered, the transport block processing procedure illustrated in FIG. 7 is performed based on one PRB, but the transport block generated by calculating the TB size based on one PRB may be divided into N sub transport blocks and the CRC may be granted to each of the corresponding sub-TBs. This will be described below with reference to drawings in order to achieve appreciation.

Figure 15:
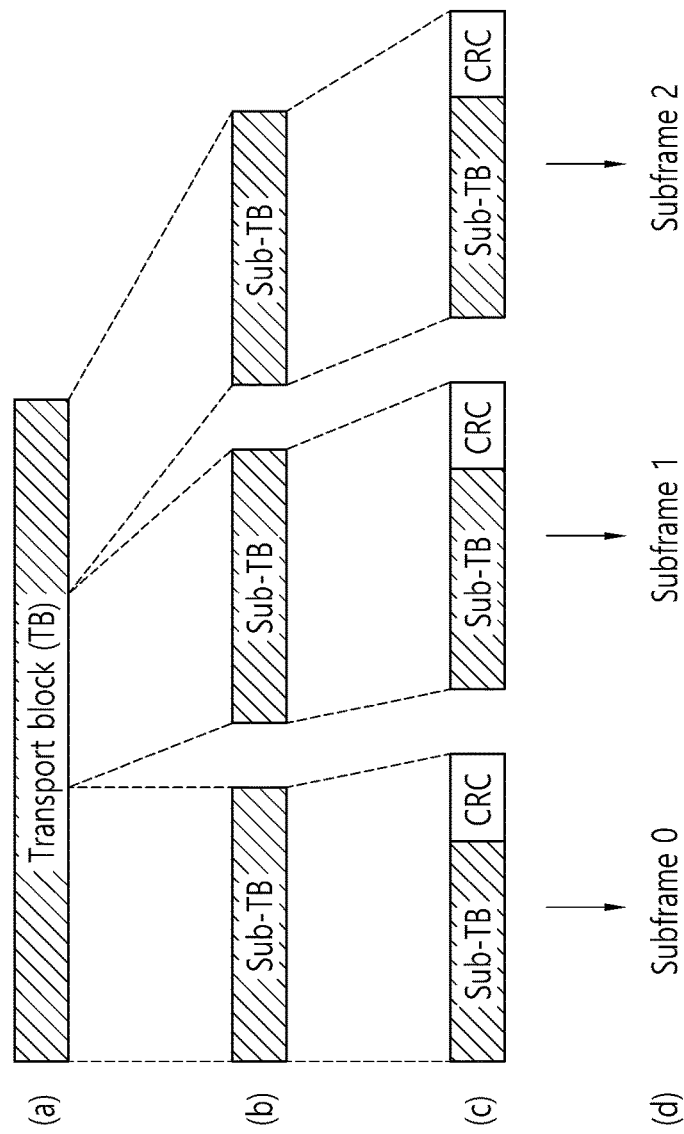
FIG. 15 illustrates an example of processing a transport block (TB) according to PUSCH transmission method 3 presented by the present specification.

FIG. 15 Illustrates an Example of Processing a Transport Block (TB) According to PUSCH Transmission Method 3 Presented by the Present Specification.

As known with reference to FIG. 15, the MTC device calculates the TB size based on one PRB to divide the generated transport block into N sub-transport blocks (TB) and grant the CRC to each corresponding sub-TB.

Thereafter, the respective sub-TBs granted with the CRCs may be transmitted through different subframes by the transport block processing procedures including channel coding, rate-matching, and the like. That is, the respective sub-TBs divided into N may be transmitted by using 1/N PRB resources through a total of N different subframes.

The transmission will be described below in more detail. The MTC device calculates the TB size based on PRB, generates the transport block having the corresponding size (FIG. 15(a) part), and divides the corresponding transport block into N sub-TBs (a procedure of FIG. 15(b)). In this case, the sizes of the respective sub-TBs may be adjusted to be the same as (similar to) each other as possible. Thereafter, the MTC device generates the CRC for each sub-TB to grant the CRC to the rear of each sub-TB (a procedure of FIG. 15(c)). Each sub-TB granted with the CRC may thereafter undergo the transport block processing procedures including the channel coding, the rate-matching, and the like and the procedures such as scrambling and modulation and thereafter, transmit while being mapped to the 1/N PRB resources of different subframe resources.

In this case, consequently, a plurality of CRCs is granted to one TB. Accordingly, the CRC granted to each sub-TB may be a CRC having a length of 8 bits by considering CRC overhead.

Figure 16:
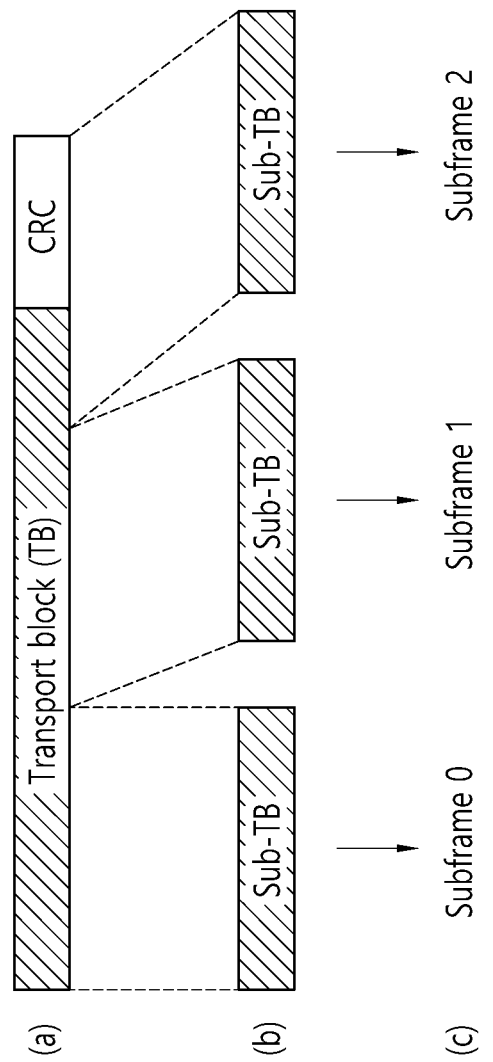
FIG. 16 illustrates another example of processing the transport block (TB) according to PUSCH transmission method 3 presented by the present specification.

FIG. 16 Illustrates Another Example of Processing the Transport Block (TB) According to PUSCH Transmission Method 3 Presented by the Present Specification.

Alternatively, as illustrated in FIG. 16, the MTC device calculates the TB size based on one PRB to grant the CRC (for example, a CRC having a length of 24 bits) to the generated transport block (a procedure of FIG. 16(a)) and divide the transport block into N sub-TBs (a procedure of FIG. 16(b)). Thereafter, the MTC device may perform the transport block processing procedures including the channel coding, the rate-matching, and the like with respect to each sub-TB and thereafter, transmit the respective corresponding sub-TBs through different subframes. That is, the respective sub-TBs divided into N may be transmitted by using 1/N PRB resources through a total of N different subframes.

Figure 17:
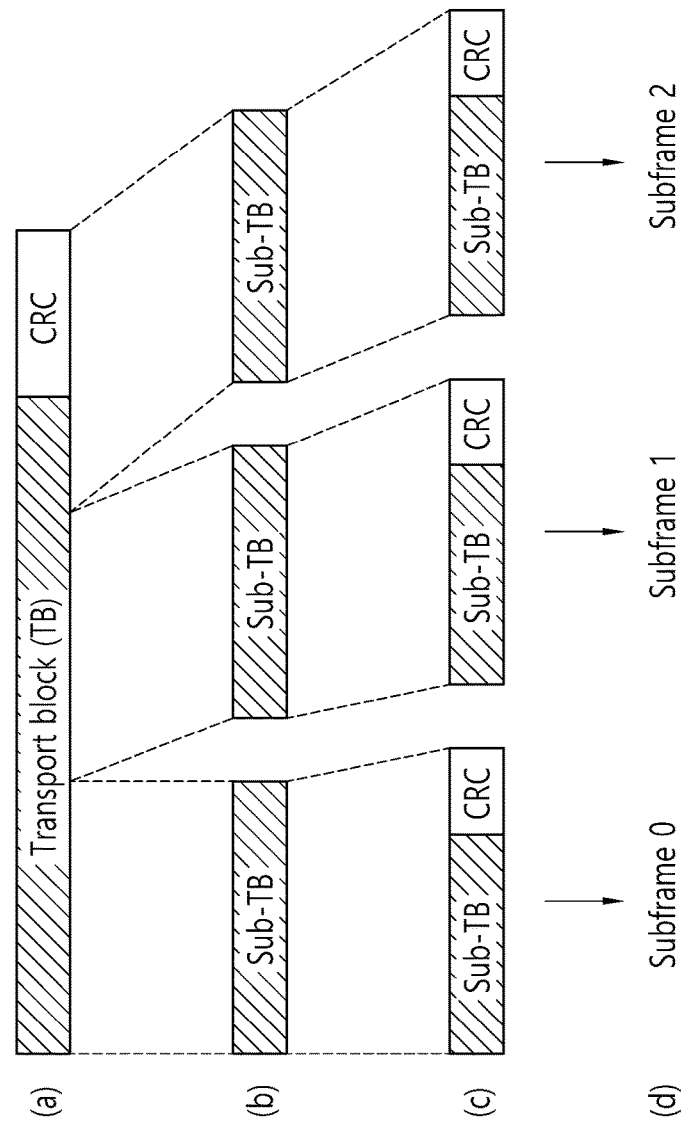
FIG. 17 illustrates yet another example of processing the transport block (TB) according to PUSCH transmission method 3 presented by the present specification.

FIG. 17 Illustrates Yet Another Example of Processing the Transport Block (TB) According to PUSCH Transmission Method 3 Presented by the Present Specification.

Alternatively, as illustrated in FIG. 17, the MTC device calculates the TB size based on one PRB to grant the CRC (for example, the CRC having the length of 24 bits) to the generated transport block (a procedure of FIG. 17(a)) and divide the transport block into N sub-TBs (a procedure of FIG. 17(b)). Thereafter, the MTC device generates the CRC for each sub-TB to grant the CRC to the rear of each sub-TB (a procedure of FIG. 17(c)). The transport block processing procedures including the channel, the rate-matching, and the like and the procedures such as scrambling and modulation may be thereafter performed with respect to each sub-TB granted with the CRC and thereafter, each sub-TB may be transmitted while being mapped to the 1/N PRB resources of different subframe resources.

IV. PUSCH Transmission Method 4

As still yet another object for transmitting the transport block generated based on PRB on N subframes through 1/N PRB, the present section proposes that a TB size having a new (smaller) size for the size of 1/N PRB is newly defined. The TB size for the 1/N PRB size may be described below.

In detail, when the TB size based on one PRB (with respect to a given TBS index) is X, X/N (alternatively, [X/N] or [X/N]) may be continuously similarly given.

That is, the TB size for a RB size smaller than one PRB may be defined and the MTC device may transmit the PUSCH to the sub-PRB area by using the corresponding TB size. The amount of data which may be transmitted through one PRB by using a large TB size may be transmitted on the plurality of subframes instead of transmitting the sub-PRB resources by using a small TB size.

In this case, the CRC having the length of 8 bits may be used instead having the length of 24 bits by considering the small TB size.

V. DMRS Transmission Method

When the PUSCH transmission technique is performed, the DMRS also needs to be transmitted on the plurality of subframes through the sub-PRB resource in which the PUSCH is transmitted. Accordingly, the present section proposes the DMRS transmission technique in which the PUSCH is transmitted on the plurality of subframes through the sub-PRB. The DMRS transmission technique proposed by the present section may applied to all PUSCH transmission methods proposed by the present specification. Alternatively, although not presented in the present specification, the DMRS transmission technique may be applied even to all cases that transmit the PUSCH on the plurality of subframes.

V-1. DMRS Transmission Method 1

When the PUSCH is transmitted on the plurality of subframes through the sub-PRB resource, the MTC device may transmit the DMRS having the same sequence in all of the plurality of subframes. As described above, in order to transmit the DMRS through 1/N PRB (that is, 12/N subcarriers) in a specific subframe, a DMRS sequence having a length of 12/N may be newly defined. For example, when N is 4, a DMRS sequence having a length of 3 may be similarly transmitted on N subframes. For example, when the DMRS is transmitted through the 1-th SC-FDMA symbol, for example, if N=4, DMRS sequences r0, r1, r2, and r3 having the length of 3 may be transmitted on 4 subframes.

Since the same DMRS sequence is transmitted on the plurality of subframes when such a transmission technique is used, the DMRSs transmitted on the plurality of subframes are combined to perform channel estimation under an environment in which the channel is not significantly changed over time.

V-2. DMRS Transmission Method 2

According to DMRS transmission method 2, the DMRS mapped based on one PRB may be separately transmitted to 1/N RBs of N subframe.

Figure 18:
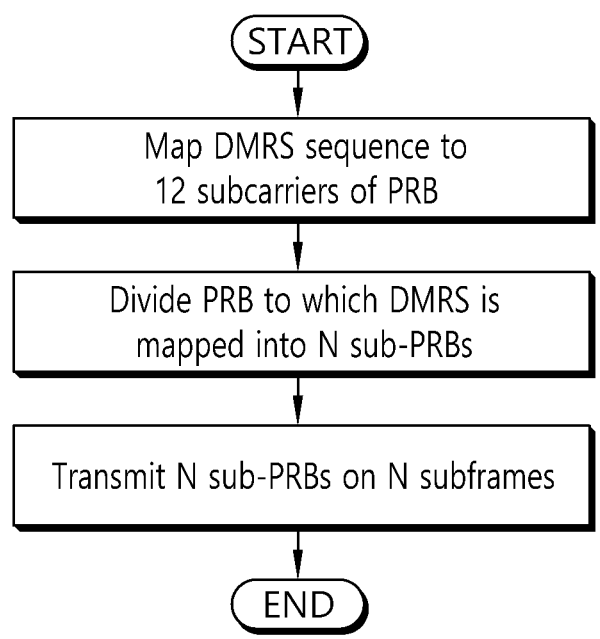
FIG. 18 is a flowchart schematically illustrating DMRS transmission method 2 presented by the present specification.

FIG. 18 is a Flowchart Schematically Illustrating DMRS Transmission Method 2 Presented by the Present Specification.

Referring to FIG. 18, the MTC device maps the DMRS sequence to 12 subcarriers of the PRB.

Subsequently, the MTC device divides the PRB mapped with the DMRS into N sub-PRBs. As a result, each sub-PRB includes 12/N subcarriers mapped with the DMRS.

Subsequently, the MTC device transmits N sub-PRBs to the base station on N subframes.

Figure 19A:
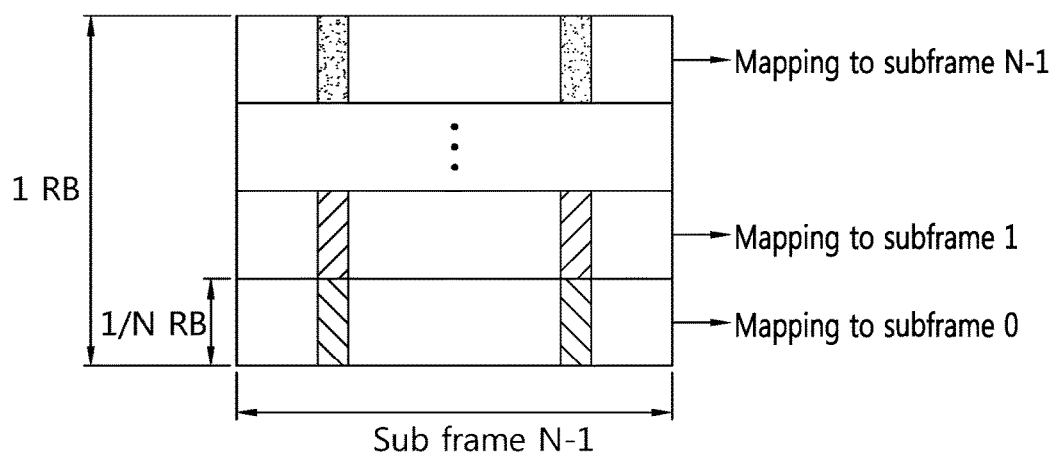
FIGS. 19a and 19b illustrate an example of transmitting the DMRS according to PUSCH transmission method 2 presented by the present specification.
Figure 19B:
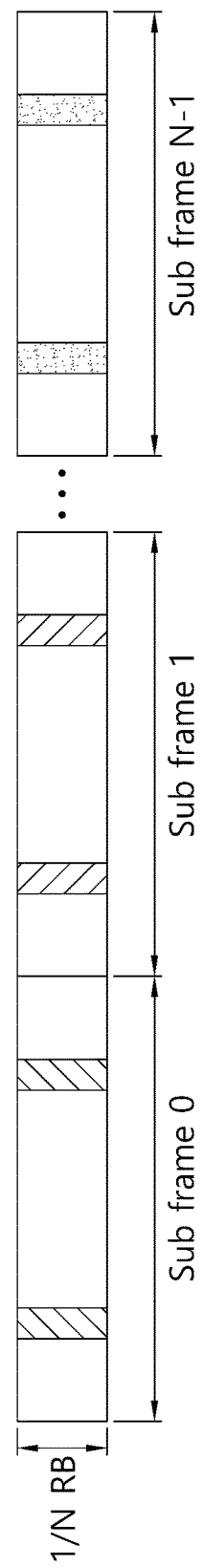

FIGS. 19a and 19b Illustrate an Example of Transmitting the DMRS According to DMRS Transmission Method 2 Presented by the Present Specification.

As illustrated in FIGS. 19a and 19b, the DMRS may be mapped based on not 1/N PRBs but one PRB and thereafter, separately transmitted to 1/N PRBs of N subframes. In this case, like 'PUSCH transmission method 2', the technique in which the PUSCH is transmitted on the plurality of subframes through the sub-PRB resource may extend to the transmission of the DMRS. In this case, the sub-PRB resource and the subframe resource area in which the DMRS is transmitted may be the same as the sub-PRB resource and the subframe resource area in which the PUSCH is transmitted.

That is, when the DMRS is transmitted through the 1-th SC-FDMA symbol, the sequence is generated like r0, r1, . . . , r11 based on one PRB and thereafter, for example, when N=3, r0, r1, r2, and r3 may be transmitted through 4 subcarriers of subframe 0, r4, r5, r6, and r7 may be transmitted through 4 subcarriers of subframe 1, and r8, r9, r10, and r11 may be transmitted through 4 subcarriers of subframe 2.

In this case, even though the DMRS is transmitted by using a small number of subcarriers in one subframe, the DMRS sequence which is as long as the length of the corresponding subcarrier need not be newly defined and all DMRS sequences transmitted through the plurality of subframes are combined to guarantee orthogonality to the DMRS which another MTC device transmits through the same resource location.

Additionally, when the DMRS may be mapped based on not 1/N PRBs but one PRB and thereafter, the DMRS may be separately transmitted to 1/N PRBs of N subframes, the used DMRS sequence may vary depending on the location of the subcarrier in which the DMRS is transmitted. For example, when the DMRS is mapped based one PRB and thereafter, the location of the subcarrier in which the DMRS in one RB is transmitted in a specific subframe is k, k+1, . . . k+M, the DMRS sequence used in the corresponding subcarrier area may also be represented by rk, rk+1, . . . , rk+M.

Since different DMRS sequences are transmitted on the plurality of subframes when such a transmission technique is used, the DMRSs transmitted on the plurality of subframes are combined not to perform channel estimation under the environment in which the channel is not significantly changed over time. However, a more enhanced channel estimation result may be acquired as compared with a case where the channel estimation is performed only by the DMRS transmitted only on one subframe by averaging the channel estimation result performed in each subframe.

VI. Configuration Associated with PUSCH/PUCCH Transmission

In the present section, a configuration associated with PUSCH or PUCCH transmission will be described.

VI-1. Data Transmission Through PUSCH or PUCCH

The present section proposes that the uplink data is transmitted through not the PUSCH but PUCCH when the amount of uplink data to be transmitted by the MTC device is small. In this case, the base station may configure whether the MTC device will transmit the uplink data through the PUSCH or PUCCH. In detail, the base station may announce, through an RRC configuration, through which channel of the PUSCH and the PUCCH the MTC device will transmit the uplink data. Alternatively, for a more dynamic configuration, the base station may announce the corresponding information through the PDCCH (uplink grant).

VI-2. Sub-PRB Transmission Mode

When the MTC device transmits the PUSCH (alternatively, PUCCH) including the uplink data on N subframe through 1/N PRBs (12/N subcarriers), the base station may configure which method the MTC device will transmit the uplink data between the 'existing PUSCH (alternatively, PUCCH) transmission method' and the 'method that transmits the PUSCH (alternatively, PUCCH) on the plurality of subframes by using the sub-PRB resource'. The method that transfers the configuration to the MTC device may be described below.

1) Method a

Which method the MTC device will transmit the uplink data between the 'existing PUSCH (alternatively, PUCCH) transmission method' and the 'method that transmits the PUSCH (alternatively, PUCCH) on the plurality of subframes by using the sub-PRB resource' may be explicitly configured semi-statically through an RRC signal or configured more dynamically through the PDCCH (uplink grant).

b) Method b

The base station may enable the MTC device to use the 'method that transmits the PUSCH (alternatively, PUCCH) on the plurality of subframes by using the sub-PRB resource' by explicitly announcing information (for example, N value) for announcing the quantity of sub-PRB resources. For example, when the value of N is larger than 1 (that is, the quantity of PRB resources for transmitting the uplink data is smaller than one PRB (12 subcarriers)), it may be assumed that the MTC device uses the 'method that transmits the PUSCH (alternatively, PUCCH) on the plurality of subframes by using the sub-PRB resource'. In this case, characteristically, when the value of N is 1 (that is, the quantity of PRB resources for transmitting the uplink data is one PRB (12 subcarriers)), it may be assumed that the MTC device transmits the uplink data by using the 'existing PUSCH (alternatively, PUCCH) transmission method'.

c) Method c

The configuration may be implicitly announced to the MTC device through an RB allocation field. When the RB allocation field represents the sub PRB resource, it may be assumed that the MTC device is configured to use the 'method that transmits the PUSCH (alternatively, PUCCH) on the plurality of subframes by using the sub-PRB resource'.

VI-3. PUSCH (PUCCH) Transmission Resource Size Information

When the MTC device transmits the uplink data by using the 'method that transmits the PUSCH (alternatively, PUCCH) on the plurality of subframes by using the sub-PRB resource', the base station may announce to the MTC device the information (for example, N value) for announcing the quantity of sub-PRB resources. The method for announcing the information to the MTC may include methods given below.

1) Method a

The base station may announce the corresponding information to the MTC device through the RRC signal. Alternatively, for the more dynamic configuration, the base station may more explicitly announce the corresponding information through the PDCCH (that is, uplink grant). In detail, when the quantity of sub-PRB resources for transmitting the uplink data on the PUSCH (alternatively, PUSCH) is 1/N PRBs (12/N subcarriers), the base station may configure the value corresponding to N in the MTC device.

b) Method b

The base station may announce the information (for example, N value) for announcing the quantity of sub-PRB resources through a resource block allocation field in the PDCCH (that is, uplink grant). In this case, the resource block allocation field may indicate the quantity and the locations of sub-PRBs which the MTC device actually uses for transmitting the uplink data.

In this case, characteristically, a method that interprets the resource block allocation field may vary depending on the configuration of the sub-PRB transmission mode. For example, when the 'sub-PRB transmission mode' indicates the 'existing PUSCH (alternatively, PUCCH) transmission method', the MTC device may interpret the resource block allocation field like the related art and when the 'sub-PRB transmission mode' indicates the 'method that transmits the PUSCH (alternatively, PUCCH) on the plurality of subframes by using the sub-PRB resource', the MTC device may interpret that the resource block allocation field indicates the quantity and the locations of resources by the unit of sub-PRB (alternatively, by the unit of subcarrier).

Meanwhile, when the MTC device knows the quantity (for example, N value) of sub-PRB resources for transmitting the PUSCH (alternatively, PUCCH) including the uplink data, the MTC device may infer information indicating with how many subframes to transmit the uplink data by using the corresponding quantity of resources. For example, when the quantity of sub-PRB resources for transmitting the PUSCH (alternatively, PUSCH) including the uplink data is 1/N PRBs (12/N subcarriers), the MTC device may autonomously know that the uplink data needs to be transmitted on N subframes.

VI-4. Calculation of TB Size

When the MTC device transmits the uplink data by using the 'method that transmits the PUSCH (alternatively, PUCCH) on the plurality of subframes by using the sub-PRB resource', the MTC device needs to know the 'reference PRB number' (that is, M) for calculating the TB size. For example, when the 'reference PRB number' for calculating the TB size is 1, the MTC device may calculate the TB size based on one PRB and transmit the corresponding TB on the plurality of subframes through the sub-PRB resource. Alternatively, when the 'reference PRB number' for calculating the TB size is 2, the MTC device may calculate the TB size based on two PRBs and transmit the corresponding TB on the plurality of subframes through the sub-PRB resource.

A method that allows the MTC device to know the 'reference PRB number' may include methods given below.

1) Method a

The MTC device may continuously assume that the 'reference PRB number' (that is, M value) is 1. That is, when the MTC device transmits the uplink data by using the 'method that transmits the PUSCH (alternatively, PUCCH) on the plurality of subframes by using the sub-PRB resource', the MTC device may continuously calculate the TB size based on one PRB and transmit the corresponding TB on the plurality of subframes through the sub-PRB resource.

b) Method b

The MTC device may interpret the RB size indicated by the resource block allocation field as the 'reference PRB number'. That is, when the MTC device transmits the uplink data by using the 'method that transmits the PUSCH (alternatively, PUCCH) on the plurality of subframes by using the sub-PRB resource', the MTC device does not interpret the value indicated by the resource block allocation field as the locations and the quantity of resources for actually transmitting the uplink data, but interpret the RB size indicated by the resource block allocation field as the 'reference PRB number' to calculate the TB size.

c) Method c

The base station may configure the 'reference PRB number' (that is, M value) in the MTC device through the RRC signal. Alternatively, the base station may more dynamically announce the corresponding information to the MTC device through the PDCCH (uplink grant).

When the contents are integrated, for example, the MTC device may operate as follows. The MTC device may first assume that the existing DCI (uplink grant) is still used. In this case, the MTC device may be configured with the 'data transmission through the PUSCH or PUCCH', the 'sub-PRB transmission mode', and/or the 'PUSCH (PUCCH) transmission resource size information' from the base station through the RRC signal. In this case, the MTC device may obtain the 'reference PRB number' for calculating the TB size through the resource block allocation field (that is, Method b) of the DCI (uplink grant).

The embodiments of the present invention which has been described up to now may be implemented through various means. For example, the embodiments of the present invention may be implemented by hardware, firmware, software, or combinations thereof. In detail, the embodiments will be descried with reference to the drawings.

Figure 20:
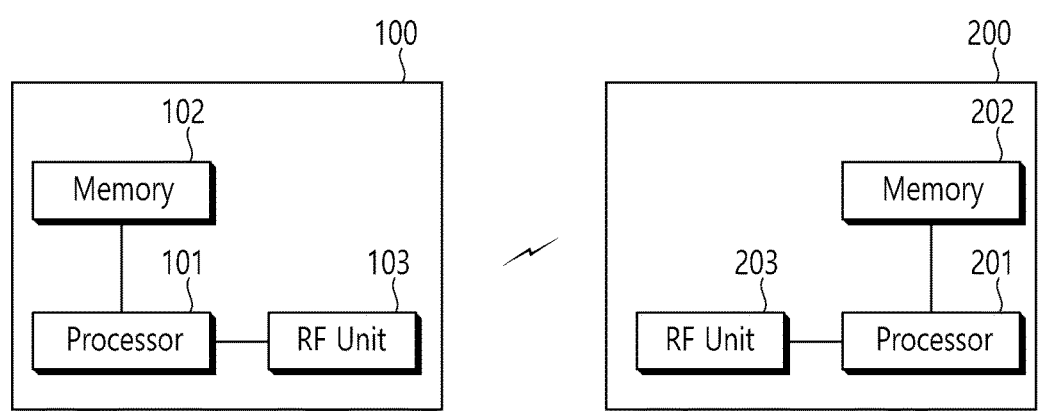
FIG. 20 is a block diagram illustrating a wireless communication system in which a disclosure of the present specification is implemented.

FIG. 20 is a Block Diagram Illustrating a Wireless Communication System in which a Disclosure of the Present Specification is Implemented.

A base station 200 includes a processor 201, a memory 202, and a radio frequency (RF) unit 203. The memory 202 is connected with the processor 201 to store various pieces of information for driving the processor 201. The RF unit 203 is connected with the processor 201 to transmit and/or receive a radio signal. The processor 201 implements a function, a process, and/or a method which are proposed. In the aforementioned embodiment, the operation of the base station may be implemented by the processor 201.

An MTC device 100 includes a processor 101, a memory 102, and an RF unit 103. The memory 102 is connected with the processor 101 to store various pieces of information for driving the processor 101. The RF unit 103 is connected with the processor 101 to transmit and/or receive a radio signal. The processor 101 implements a function, a process, and/or a method which are proposed.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for transmitting a demodulation reference signal (DMRS) for demodulating uplink data by a single machine type communication (MTC) device which is configured to operate in only a part of a system band of a cell, the method comprising:

mapping, by the single MTC device, a DMRS sequence to 12 subcarriers of a physical resource block (PRB);

dividing, by the single MTC device, the PRB, to which the DMRS sequence is mapped, into N sub-PRBs, each sub-PRB including 12/N subcarriers to which the DMRS sequence is mapped, where N is an integer; and transmitting, by the single MTC device, the N sub-PRBs to a base station on N subframes, wherein the N sub-PRBs are distributed and transmitted in the N subframes, wherein a first sub-PRB of the N sub-PRBs is transmitted at a first frequency region in a first subframe of the N subframes, and wherein a second sub-PRB of the N sub-PRBs is transmitted at a second frequency region in a second subframe of the N subframes.

2. The method of claim 1, further comprising:

mapping the uplink data to 12 subcarriers of the same PRB as the PRB to which the DMRS sequence is mapped;

dividing the PRB into N sub-PRBs, each sub-PRB including 12/N subcarriers to which the DMRS sequence and the uplink data are mapped; and transmitting the N sub-PRBs to which the DMRS sequence and the uplink data are mapped on N subframes.

3. The method of claim 1, further comprising:

receiving a configuration of the value of N from the base station through a radio resource signal (RRC) or downlink control information (DCI).

4. A single machine type communication (MTC) device which is configured to operate in only a part of a system band of a cell and transmits a demodulation reference signal (DMRS) for demodulating uplink data, the single MTC device comprising:

a transmitter; and a processor coupled to the transmitter and configured to:

map a DMRS sequence to 12 subcarriers of a physical resource block (PRB), divide the PRB, to which the DMRS sequence is mapped, into N sub-PRBs, each sub-PRB including 12/N sub-carriers to which the DMRS sequence is mapped, where N is an integer, and control the transmitter to transmit the N sub-PRBs to a base station in N subframes, wherein the N sub-PRBs are distributed and transmitted in the N subframes, wherein a first sub-PRB of the N sub-PRBs is transmitted at a first frequency region in a first subframe of the N subframes, and wherein a second sub-PRB of the N sub-PRBs is transmitted at a second frequency region in a second subframe of the N subframes.

5. The single MTC device of claim 4, wherein the processor is further configured to:

map the uplink data to 12 subcarriers of the same PRB as the PRB to which the DMRS sequence is mapped, divide the PRB into N sub-PRBs, each sub-PRB including 12/N subcarriers to which the DMRS sequence and the uplink data are mapped, and control the transmitter to transmit the N sub-PRBs to which the DMRS sequence and the uplink data are mapped on N subframes.

6. The single MTC device of claim 4, further comprising:

a receiver configured to receive a configuration of the value of N from the base station through a radio resource signal (RRC) or downlink control information (DCI).

* * * * *